United States Patent
Keeler et al.

(10) Patent No.: US 12,359,618 B2
(45) Date of Patent: Jul. 15, 2025

(54) GAS TURBINE FUEL RETURN LINE

(71) Applicant: ROLLS-ROYCE plc, London (GB)

(72) Inventors: Benjamin J Keeler, Chesterfield (GB); Craig W Bemment, Derby (GB); Andrea Minelli, Derby (GB); David M Beaven, Nottingham (GB); Paul W Ferra, Derby (GB); Christopher P Madden, Derby (GB); Peter Swann, Derby (GB); Martin K Yates, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/753,195

(22) Filed: Jun. 25, 2024

(65) Prior Publication Data

US 2025/0198335 A1  Jun. 19, 2025

(30) Foreign Application Priority Data

Dec. 14, 2023 (GB) ..................... 2319131

(51) Int. Cl.
F02C 7/14 (2006.01)
F02C 7/224 (2006.01)
F02C 7/232 (2006.01)

(52) U.S. Cl.
CPC ............... *F02C 7/14* (2013.01); *F02C 7/224* (2013.01); *F02C 7/232* (2013.01)

(58) Field of Classification Search
CPC .. F02C 7/14; F02C 7/224; F02C 7/232; F02C 7/22; F02C 7/222; F02C 7/228; F02C 9/26; F02C 9/28; F02C 9/36; F02C 9/38; F05D 2220/323; F05D 2260/213
See application file for complete search history.

(56) References Cited

U.S. PATENT DOCUMENTS

| | | | |
|---|---|---|---|
| 3,779,007 A | 12/1973 | Lavash | |
| 4,776,536 A | 10/1988 | Hudson et al. | |
| 5,118,258 A | 6/1992 | Martin | |
| 5,241,814 A | 9/1993 | Butler | |
| 5,805,973 A | 9/1998 | Coffinberry et al. | |

(Continued)

FOREIGN PATENT DOCUMENTS

| | | |
|---|---|---|
| EP | 3 540 196 A1 | 9/2019 |
| EP | 4 202 198 A1 | 6/2023 |

OTHER PUBLICATIONS

U.S. Appl. No. 18/753,208, filed Jun. 25, 2024 in the name of Keeeler et al.

(Continued)

*Primary Examiner* — Alain Chau
*Assistant Examiner* — Henry Ng
(74) *Attorney, Agent, or Firm* — Oliff PLC

(57) ABSTRACT

A gas turbine engine for an aircraft, comprising: a combustor; a fuel-oil heat exchanger arranged to receive fuel from a fuel tank on board the aircraft and transfer heat from the oil to the fuel; a fuel return line arranged to return at least some fuel that has passed through the heat exchanger to the fuel tank; and a modulator valve arranged to modulate the flow of fuel along the fuel return line such that a ratio of a temperature, in Kelvin, of fuel in the fuel tank to a temperature, in Kelvin, of fuel being delivered to the combustor is less than 0.56. Methods of operating a gas turbine engine are also disclosed.

21 Claims, 10 Drawing Sheets

(56) References Cited

U.S. PATENT DOCUMENTS

| | | | |
|---|---|---|---|
| 6,709,492 B1 | 3/2004 | Spadaccini et al. | |
| 10,443,503 B2* | 10/2019 | Alecu | F02C 7/236 |
| 10,752,374 B1* | 8/2020 | Lui | B64D 13/08 |
| 11,148,824 B2 | 10/2021 | Niergarth et al. | |
| 11,708,795 B1* | 7/2023 | Mastrocola | F02C 7/14 |
| | | | 60/39.281 |
| 2004/0011052 A1* | 1/2004 | Clements | F02C 9/263 |
| | | | 60/773 |
| 2011/0100015 A1 | 5/2011 | Alagappan et al. | |
| 2012/0032809 A1 | 2/2012 | Comotto et al. | |
| 2012/0227409 A1* | 9/2012 | Paradise | F02C 7/12 |
| | | | 137/468 |
| 2013/0086909 A1 | 4/2013 | Wang et al. | |
| 2016/0024968 A1 | 1/2016 | Stearns et al. | |
| 2016/0178204 A1* | 6/2016 | Wang | F23R 3/28 |
| | | | 137/565.13 |
| 2016/0265438 A1* | 9/2016 | Keeler | F02C 7/14 |
| 2016/0281603 A1* | 9/2016 | Appukuttan | F02C 7/224 |
| 2017/0058774 A1 | 3/2017 | Pickford | |
| 2018/0080688 A1* | 3/2018 | Snape | F02C 3/04 |
| 2019/0277201 A1* | 9/2019 | Veilleux, Jr. | B64D 37/32 |
| 2020/0140113 A1 | 5/2020 | Niergarth et al. | |
| 2020/0269991 A1 | 8/2020 | Niergarth et al. | |
| 2021/0229827 A1* | 7/2021 | Doman | F02C 7/14 |
| 2021/0339878 A1 | 11/2021 | Niergarth et al. | |
| 2021/0340938 A1 | 11/2021 | Miller et al. | |
| 2022/0106053 A1* | 4/2022 | Snyder | B64D 33/10 |
| 2022/0252011 A1 | 8/2022 | Rambo et al. | |
| 2022/0381186 A1* | 12/2022 | Adique | F02C 9/26 |
| 2023/0068644 A1* | 3/2023 | Thivierge | F02C 7/224 |
| 2023/0279810 A1 | 9/2023 | Mochrie | |
| 2023/0279812 A1 | 9/2023 | Mochrie et al. | |
| 2023/0296253 A1* | 9/2023 | Miranda | F02C 6/18 |
| | | | 60/773 |
| 2023/0339621 A1* | 10/2023 | Sarkar | F02C 3/22 |
| 2023/0392551 A1* | 12/2023 | Minas | F02C 7/224 |
| 2023/0399980 A1* | 12/2023 | Li | F02C 7/222 |

OTHER PUBLICATIONS

U.S. Appl. No. 18/753,070, filed Jun. 25, 2024 in the name of Keeeler et al.
Boeing B737 NG—Systems Summary, https://737ng.co.uk/B_NG-Fuel.pdf, (year: 2016).

* cited by examiner

2000 → MODULATING THE FLOW OF FUEL ALONG THE FUEL RETURN LINE USING THE MODULATOR VALVE SUCH THAT A RATIO OF A TEMPERATURE OF FUEL IN THE FUEL TANK TO A TEMPERATURE OF FUEL BEING DELIVERED TO THE COMBUSTOR ($\Delta T$) SATISFIES A PREDETERMINED STANDARD

FIG. 8

2100 → MODULATING THE FLOW OF FUEL ALONG THE FUEL RETURN LINE USING THE MODULATOR VALVE SUCH THAT THE RATIO OF $\Delta T$ AT CRUISE TO $\Delta T$ AT START-UP OF THE ENGINE 10 SATISFIES A PREDETERMINED STANDARD

FIG. 9

2200 → INITIATING RETURN OF FUEL TO THE FUEL TANK USING THE MODULATOR VALVE WHEN FUEL HAVING PASSED THROUGH THE HEAT EXCHANGER(S) IS AT A TEMPERATURE OF AT LEAST 120°C OR WITHIN A PREDETERMINED RANGE

FIG. 10

2300 → MODULATING FLOW OF FUEL ALONG THE FUEL RETURN LINE SUCH THAT A RATIO OF FUEL MASS RETURNED TO THE TANK TO FUEL MASS DELIVERED TO THE COMBUSTOR IS BETWEEN 0 AND 9 AT CRUISE CONDITIONS

FIG. 11

2400 → PREVENTING RETURN OF FUEL HAVING A TEMPERATURE OF 180°C OR GREATER TO THE FUEL TANK USING THE MODULATOR VALVE

FIG. 12

2500 → MODULATING THE FLOW OF FUEL ALONG THE FUEL RECIRCULATION LINE

FIG. 13

GAS TURBINE FUEL RETURN LINE

CROSS-REFERENCE TO RELATED APPLICATIONS

This specification is based upon and claims the benefit of priority from UK Patent Application Number 2319131.5 filed on 14 Dec. 2023, the entire contents of which are incorporated herein by reference.

BACKGROUND

Field of the Disclosure

The present disclosure relates to gas turbine engines configured to operate using fuels different from traditional kerosene-based jet fuels, and methods of operating a gas turbine engine using fuels different from traditional kerosene-based jet fuels.

Description of the Related Art

There is an expectation in the aviation industry of a trend towards the use of fuels different from the traditional kerosene-based jet fuels generally used at present. It is desirable to manage heat and fuel within the engine according to the type of fuel being used. This may allow advantageous use of the properties of fuel that are not available for kerosene-based jet fuel.

SUMMARY

According to a first aspect, there is provided a gas turbine engine for an aircraft, the gas turbine engine comprising:
  a combustor:
  a fuel-oil heat exchanger arranged to receive fuel from a fuel tank on board the aircraft and transfer heat from the oil to the fuel;
  a fuel return line arranged to return at least some fuel that has passed through the heat exchanger to the fuel tank; and
  a modulator valve arranged to modulate the flow of fuel along the fuel return line such that a ratio of a temperature, in Kelvin, of fuel in the fuel tank to a temperature, in Kelvin, of fuel being delivered to the combustor is less than 0.56.

The modulator valve may be arranged to modulate the flow of fuel along the fuel return line such that the ratio of the temperature, in Kelvin, of fuel in the fuel tank to the temperature, in Kelvin, of fuel being delivered to the combustor is less than 0.53.

The modulator valve may be arranged to modulate the flow of fuel along the fuel return line such that the ratio of the temperature, in Kelvin, of fuel in the fuel tank to the temperature, in Kelvin, of fuel being delivered to the combustor is between 0.48 and 0.56.

The modulator valve may be arranged to modulate the flow of fuel along the fuel return line such that the ratio of the temperature, in Kelvin, of fuel in the fuel tank to the temperature, in Kelvin, of fuel being delivered to the combustor is between 0.48 and 0.53.

According to a second aspect, there is provided a method of operating a gas turbine engine, the gas turbine engine comprising:
  a combustor;
  a fuel-oil heat exchanger arranged to receive fuel from a fuel tank on board the aircraft and transfer heat from the oil to the fuel;
  a fuel return line arranged to return at least some fuel that has passed through the heat exchanger to the fuel tank; and
  a modulator valve arranged to modulate the flow of fuel along the fuel return line;
  wherein the method comprises modulating the flow of fuel along the fuel return line using the modulator valve such that a ratio of a temperature, in Kelvin, of fuel in the fuel tank to a temperature, in Kelvin, of fuel being delivered to the combustor is less than 0.56.

The method may comprise modulating the flow of fuel along the fuel return line using the modulator valve such that the ratio of the temperature, in Kelvin, of fuel in the fuel tank to the temperature, in Kelvin, of fuel being delivered to the combustor is less than 0.53.

The method may comprise modulating the flow of fuel along the fuel return line using the modulator valve such that the ratio of the temperature, in Kelvin, of fuel in the fuel tank to the temperature, in Kelvin, of fuel being delivered to the combustor is between 0.48 and 0.56.

The method may comprise modulating the flow of fuel along the fuel return line using the modulator valve such that the ratio of the temperature, in Kelvin, of fuel in the fuel tank to the temperature, in Kelvin, of fuel being delivered to the combustor is between 0.48 and 0.53.

According to a third aspect, there is provided a gas turbine engine for an aircraft, the gas turbine engine comprising:
  a combustor:
  a fuel-oil heat exchanger arranged to receive fuel from a fuel tank on board the aircraft and transfer heat from the oil to the fuel;
  a fuel return line arranged to return at least some fuel that has passed through the heat exchanger to the fuel tank; and
  a modulator valve arranged to modulate the flow of fuel along the fuel return line such that a ratio of a temperature, in Kelvin, of fuel in the fuel tank to a temperature, in Kelvin, of fuel being delivered to the combustor is between 0.48 and 1.00.

The modulator valve may be arranged to modulate the flow of fuel along the fuel return line such that the ratio of the temperature, in Kelvin, of fuel in the fuel tank to the temperature, in Kelvin, of fuel being delivered to the combustor is:
  a) between 0.48 and 0.90;
  b) between 0.48 and 0.82;
  c) between 0.56 and 1.00;
  d) between 0.56 and 0.82; or
  e) between 0.56 and 0.75.

According to a fourth aspect, there is provided a method of operating a gas turbine engine, the gas turbine engine comprising:
  a combustor:
  a fuel-oil heat exchanger arranged to receive fuel from a fuel tank on board the aircraft and transfer heat from the oil to the fuel;
  a fuel return line arranged to return at least some fuel that has passed through the heat exchanger to the fuel tank; and
  a modulator valve arranged to modulate the flow of fuel along the fuel return line;
  wherein the method comprises modulating the flow of fuel along the fuel return line using the modulator valve such that a ratio of a temperature, in Kelvin, of fuel in the fuel tank to a temperature, in Kelvin, of fuel being delivered to the combustor is between 0.48 and 1.00.

The method may comprise modulating the flow of fuel along the fuel return line using the modulator valve such that the ratio of the temperature, in Kelvin, of fuel in the fuel tank to the temperature, in Kelvin, of fuel being delivered to the combustor is:
a) between 0.48 and 0.90;
b) between 0.48 and 0.82;
c) between 0.56 and 1.00;
d) between 0.56 and 0.82; or
e) between 0.56 and 0.75.

According to a fifth aspect there is provided a gas turbine engine for an aircraft, the gas turbine engine comprising:
a combustor:
a fuel-oil heat exchanger arranged to receive fuel from a fuel tank on board the aircraft and transfer heat from the oil to the fuel;
a fuel return line arranged to return at least some fuel that has passed through the heat exchanger to the fuel tank; and
a modulator valve arranged to modulate the flow of fuel along the fuel return line such that a ratio of $\Delta T$ at cruise to $\Delta T$ at start-up is less than 0.56, wherein $\Delta T$ is a ratio of a temperature, in Kelvin, of fuel in the fuel tank to a temperature, in Kelvin, of fuel being delivered to the combustor.

The modulator valve may be arranged to modulate the flow of fuel along the fuel return line such that the ratio of $\Delta T$ at cruise to $\Delta T$ at start-up is less than 0.53.

The modulator valve may be arranged to modulate the flow of fuel along the fuel return line such that the ratio of $\Delta T$ at cruise to $\Delta T$ at start-up is between 0.48 and 0.56.

The modulator valve may be arranged to modulate the flow of fuel along the fuel return line such that the ratio of $\Delta T$ at cruise to $\Delta T$ at start-up is between 0.48 and 0.53.

According to a sixth aspect there is provided a method of operating a gas turbine engine, the gas turbine engine comprising:
a combustor:
a fuel-oil heat exchanger arranged to receive fuel from a fuel tank on board the aircraft and transfer heat from the oil to the fuel;
a fuel return line arranged to return at least some fuel that has passed through the heat exchanger to the fuel tank; and
a modulator valve arranged to modulate the flow of fuel along the fuel return line, wherein the method comprises modulating the flow of fuel along the fuel return line using the modulator valve such that a ratio of $\Delta T$ at cruise to $\Delta T$ at start-up is less than 0.56, wherein $\Delta T$ is a ratio of a temperature, in Kelvin, of fuel in the fuel tank to a temperature, in Kelvin, of fuel being delivered to the combustor.

The method may comprise modulating the flow of fuel along the fuel return line using the modulator valve such that the ratio of $\Delta T$ at cruise to $\Delta T$ at start-up is less than 0.53.

The method may comprise modulating the flow of fuel along the fuel return line using the modulator valve such that the ratio of $\Delta T$ at cruise to $\Delta T$ at start-up is between 0.48 and 0.56.

The method may comprise modulating the flow of fuel along the fuel return line using the modulator valve such that the ratio of $\Delta T$ at cruise to $\Delta T$ at start-up is between 0.48 and 0.53.

According to a seventh aspect there is provided a gas turbine engine for an aircraft, the gas turbine engine comprising:
a combustor;
a fuel-oil heat exchanger arranged to receive fuel from a fuel tank on board the aircraft and transfer heat from the oil to the fuel;
a fuel return line arranged to return at least some fuel that has passed through the heat exchanger to the fuel tank; and
a modulator valve arranged to modulate the flow of fuel along the fuel return line such that a ratio of $\Delta T$ at cruise to $\Delta T$ at start-up is between 0.48 and 1.88, wherein $\Delta T$ is a ratio of a temperature, in Kelvin, of fuel in the fuel tank to a temperature, in Kelvin, of fuel being delivered to the combustor.

The modulator valve may be arranged to modulate the flow of fuel along the fuel return line such that the ratio of $\Delta T$ at cruise to $\Delta T$ at start-up is:
a) between 0.48 and 1.71;
b) between 0.48 and 1.70 (for example, where $\Delta T$ at start-up is $\Delta T$ at start-up of the aircraft while it is on the ground);
c) between 0.48 and 1.55 (for example, where $\Delta T$ at start-up is $\Delta T$ at start-up of the aircraft while it is on the ground);
d) between 0.48 and 1.88 (for example, where $\Delta T$ at start-up is $\Delta T$ at start-up of the aircraft while it is in the air); or
e) between 0.48 and 1.71 (where $\Delta T$ at start-up is $\Delta T$ at start-up of the aircraft while it is in the air).

According to an eighth aspect there is provided a method of operating a gas turbine engine, the gas turbine engine comprising:
a combustor:
a fuel-oil heat exchanger arranged to receive fuel from a fuel tank on board the aircraft and transfer heat from the oil to the fuel;
a fuel return line arranged to return at least some fuel that has passed through the heat exchanger to the fuel tank; and
a modulator valve arranged to modulate the flow of fuel along the fuel return line, wherein the method comprises modulating the flow of fuel along the fuel return line using the modulator valve such that a ratio of $\Delta T$ at cruise to $\Delta T$ at start-up is between 0.48 and 1.88, wherein $\Delta T$ is a ratio of a temperature, in Kelvin, of fuel in the fuel tank to a temperature, in Kelvin, of fuel being delivered to the combustor.

The method may comprise modulating the flow of fuel along the fuel return line using the modulator valve such that the ratio of $\Delta T$ at cruise to $\Delta T$ at start-up is:
a) between 0.48 and 1.71;
b) between 0.48 and 1.70 (for example, where $\Delta T$ at start-up is $\Delta T$ at start-up of the aircraft while it is on the ground);
c) between 0.48 and 1.55 (for example, where $\Delta T$ at start-up is $\Delta T$ at start-up of the aircraft while it is on the ground);
d) between 0.48 and 1.88 (for example, where $\Delta T$ at start-up is $\Delta T$ at start-up of the aircraft while it is in the air); or
e) between 0.48 and 1.71 (where $\Delta T$ at start-up is $\Delta T$ at start-up of the aircraft while it is in the air).

According to a ninth aspect there is provided a gas turbine engine for an aircraft, the gas turbine engine comprising:

a combustor:
a fuel-oil heat exchanger arranged to receive fuel from a fuel tank on board the aircraft and transfer heat from the oil to the fuel;
a fuel return line arranged to return at least some fuel that has passed through the heat exchanger to the fuel tank; and
a modulator valve arranged to modulate the flow of fuel along the fuel return line, wherein the modulator valve is arranged to initiate return of fuel to the fuel tank when fuel having passed through the heat exchanger is at a temperature of at least 120° C.

The modulator valve may be arranged to initiate return of fuel to the fuel tank when fuel having passed through the heat exchanger is at a temperature of at least 140° C.

The modulator valve may be arranged to initiate return of fuel to the fuel tank when fuel having passed through the heat exchanger is at a temperature of between 120° C. and 180° C., and preferably is at a temperature of between 140° C. and 180° C.

The modulator valve may be arranged to initiate return of fuel to the fuel tank when:
i) an indication of an operating condition is provided; and
ii) fuel having passed through the heat exchanger is at a temperature of at least 120° C., preferably at least 140° C.

The operating condition may be one or more of a proportion of sustainable aviation fuel (SAF) in the fuel, a thermal stability of the fuel, a coking level of the fuel, an oxygen content of the fuel and a sulphur content of the fuel.

The gas turbine engine may further comprise a sensor configured to detect one or more operating conditions.

According to a tenth aspect there is provided a method of operating a gas turbine engine, the gas turbine engine comprising:
a combustor;
a fuel-oil heat exchanger arranged to receive fuel from a fuel tank on board the aircraft and transfer heat from the oil to the fuel;
a fuel return line arranged to return at least some fuel that has passed through the heat exchanger to the fuel tank; and
a modulator valve arranged to modulate the flow of fuel along the fuel return line;
wherein the method comprises initiating return of fuel to the fuel tank using the modulator valve when fuel having passed through the heat exchanger is at a temperature of at least 120° C.

The method may comprise initiating return of fuel to the fuel tank using the modulator valve when fuel having passed through the heat exchanger is at a temperature of at least 140° C.

The method may comprise initiating return of fuel to the fuel tank using the modulator valve when fuel having passed through the heat exchanger is at a temperature of between 120° C. and 180° C., and preferably is at a temperature of between 140° C. and 180° C.

The method may comprise initiating return of fuel to the fuel tank using the modulator valve when:
i) an indication of an operating condition is provided; and
ii) fuel having passed through the heat exchanger is at a temperature of at least 120° C., preferably at least 140° C.

The operating condition may be one or more of a proportion of sustainable aviation fuel (SAF) in the fuel, a thermal stability of the fuel, a coking level of the fuel, an oxygen content of the fuel and a sulphur content of the fuel.

The gas turbine engine may further comprise a sensor configured to detect one or more operating conditions. The method may comprise detecting one or more operating conditions using the sensor.

According to an eleventh aspect there is provided a gas turbine engine for an aircraft, the gas turbine engine comprising:
a combustor:
a fuel-oil heat exchanger arranged to receive fuel from a fuel tank on board the aircraft and transfer heat from the oil to the fuel;
a fuel return line arranged to return at least some fuel that has passed through the heat exchanger to the fuel tank; and
a modulator valve arranged to modulate the flow of fuel along the fuel return line such that a ratio of fuel mass returned to the tank to fuel mass delivered to the combustor is between 0 and 9 at cruise conditions.

The "fuel mass returned to the fuel tank" and the "fuel mass delivered to the combustor" may be expressed as a fuel flow rate in mass of fuel flow per unit time (e.g., in kg/s). By "fuel mass delivered to the combustor" in the eleventh and twelfth aspect we may mean the "burnt fuel mass" e.g., the amount of fuel combusted by the combustor in units of fuel flow rate per unit time.

The modulator valve may be arranged to modulate the flow of fuel along the fuel return line such that the ratio of fuel mass returned to the tank to fuel mass delivered to the combustor is between 2.3 and 9 at cruise conditions.

The modulator valve may be arranged to modulate the flow of fuel along the fuel return line such that the ratio of fuel mass returned to the tank to fuel mass delivered to the combustor is greater than 4 and less than or equal to 9 at cruise conditions.

The modulator valve may be arranged to modulate the flow of fuel along the fuel return line such that the ratio of fuel mass returned to the tank to fuel mass delivered to the combustor is greater than 4 and less than or equal to 4.9 at cruise conditions.

According to a twelfth aspect there is provided a method of operating a gas turbine engine, the gas turbine engine comprising:
a combustor:
a fuel-oil heat exchanger arranged to receive fuel from a fuel tank on board the aircraft and transfer heat from the oil to the fuel;
a fuel return line arranged to return at least some fuel that has passed through the heat exchanger to the fuel tank; and
a modulator valve arranged to modulate the flow of fuel along the fuel return line;
wherein the method comprises modulating the flow of fuel along the fuel return line using the modulator valve such that a ratio of fuel mass returned to the fuel tank to fuel mass delivered to the combustor is between 0 and 9 at cruise conditions.

The method may comprise modulating the flow of fuel along the fuel return line using the modulator valve such that a ratio of fuel mass returned to the tank to fuel mass delivered to the combustor is between 2.3 and 9 at cruise conditions.

The method may comprise modulating the flow of fuel along the fuel return line using the modulator valve such that a ratio of fuel mass returned to the tank to fuel mass delivered to the combustor is greater than 4 and less than or equal to 9 at cruise conditions.

The method may comprise modulating the flow of fuel along the fuel return line using the modulator valve such that a ratio of fuel mass returned to the tank to fuel mass delivered to the combustor is greater than 4 and less than or equal to 4.9 at cruise conditions.

According to a thirteenth aspect there is provided a gas turbine engine for an aircraft, the gas turbine engine comprising:
- a combustor:
- a fuel-oil heat exchanger arranged to receive fuel from a fuel tank on board the aircraft and transfer heat from the oil to the fuel;
- a fuel return line arranged to return at least some fuel that has passed through the heat exchanger to the fuel tank; and
- a modulator valve arranged to modulate the flow of fuel along the fuel return line, wherein the modulator valve is arranged to prevent return of fuel having a temperature of 180° C. or greater to the fuel tank.

The modulator valve may be arranged to prevent return of fuel to the fuel tank when a temperature of fuel in the fuel tank is at a pre-determined upper threshold temperature.

The pre-determined upper threshold temperature may be 100° C. The pre-determined upper threshold temperature may be 65° C. The pre-determined upper threshold temperature may be 55° C. The pre-determined upper threshold temperature may be 5° C.

The modulator valve may be arranged to modulate a flow of fuel along the fuel return line based at least in part on a temperature of fuel that has passed through the heat exchanger, a temperature of fuel in the fuel tank, and a quantity of fuel remaining in the tank.

The modulator valve may be arranged to modulate the flow of fuel along the fuel return line such that an equilibrium temperature of fuel in the fuel tank, once mixed with fuel returned to the tank along the fuel return line, does not exceed the pre-determined upper threshold temperature.

According to a fourteenth aspect there is provided a method of operating a gas turbine engine, the gas turbine engine comprising:
- a combustor:
- a fuel-oil heat exchanger arranged to receive fuel from a fuel tank on board the aircraft and transfer heat from the oil to the fuel;
- a fuel return line arranged to return at least some fuel that has passed through the heat exchanger to the fuel tank; and
- a modulator valve arranged to modulate the flow of fuel along the fuel return line;
- wherein the method comprises preventing return of fuel having a temperature of 180° C. or greater to the fuel tank using the modulator valve.

The method may comprise preventing return of fuel to the fuel tank using the modulator valve when a temperature of fuel in the fuel tank is at a pre-determined upper threshold temperature.

The pre-determined upper threshold temperature may be 100° C. The pre-determined upper threshold temperature may be 65° C. The pre-determined upper threshold may be 55° C. The pre-determined upper threshold temperature may be 5° C.

The method may comprise modulating a flow of fuel along the fuel return line using the modulator valve based at least in part on a temperature of fuel that has passed through the heat exchanger, a temperature of fuel in the fuel tank, and a quantity of fuel remaining in the tank.

The method may comprise modulating a flow of fuel along the fuel return line using the modulator valve such that an equilibrium temperature of fuel in the fuel tank, once mixed with fuel returned to the tank along the fuel return line, does not exceed the pre-determined upper threshold temperature.

According to a fifteenth aspect there is provided a gas turbine engine for an aircraft, the gas turbine engine comprising:
- a combustor:
- a fuel-oil heat exchanger arranged to receive fuel and transfer heat from the oil to the fuel so as to raise the fuel temperature to at least 120° C. on entry to the combustor;
- a fuel recirculation line arranged to recirculate at least some fuel on a fuel flow path from a first point on the fuel flow path to a second point on the fuel flow path, the second point upstream of the first point; and
- a modulator valve arranged to modulate the flow of fuel along the fuel recirculation line.

The fuel recirculation line may be arranged to recirculate fuel from a first point downstream of the fuel-oil heat exchanger to a second point upstream of the fuel-oil heat exchanger.

The gas turbine engine may further comprise a fuel pump on the fuel flow path. The fuel recirculation line may be arranged to recirculate fuel from a first point downstream of the fuel pump to a second point upstream of the fuel pump.

The fuel pump may be downstream of the fuel-oil heat exchanger on the fuel flow path.

The fuel recirculation line may be arranged to supply fuel to one or more additional aircraft and/or engine mechanisms.

The one or more additional aircraft and/or engine mechanisms may be or comprise one or more of a nacelle anti-icing system, actuators, bleed valves, heat management modulating valves (for example, for the engine and/or a generator system and a turbine case cooling system).

The fuel flow path may be a main fuel flow path between a fuel tank on board the aircraft and the combustor. The fuel-oil heat exchanger may be a primary fuel-oil heat exchanger located on the main fuel flow path.

The second point may be located downstream of a low-pressure fuel pump by which fuel is pumped to the gas turbine engine from the fuel tank.

The first point may be located downstream of the primary fuel-oil heat exchanger. The first point may be located downstream of a fuel pump configured to supply fuel to the combustor (i.e. a high-pressure fuel pump).

The engine may further comprise a secondary fuel-oil heat exchanger located in the main flow path (e.g., in series with the main heat exchanger). The second point may be downstream of the secondary heat exchanger.

Alternatively, the engine may further comprise a secondary fuel-oil heat exchanger with a flow line leading from the main flow path to the secondary fuel-oil heat exchanger and a flow line re-joining the main flow path from the secondary heat exchanger (e.g., such that it is in parallel with the main flow path). The second point may be located upstream of the inlet of the line leading to the secondary fuel-oil heat exchanger and the first point may be located downstream of an outlet of the line re-joining the main fuel flow path from the secondary fuel-oil heat exchanger. The second point may be upstream of the primary fuel-oil heat exchanger.

The fuel-oil heat exchanger may be arranged to transfer heat from the oil to the fuel so as to raise the fuel temperature to at least 140° C. on entry to the combustor (i.e. the heat exchanger may be arranged to transfer heat from the oil to the fuel to raise the temperature of the fuel to those temperatures before it enters the combustor).

The heat exchanger may be arranged to transfer heat from the oil to the fuel so as to raise the fuel temperature to between 120° C. and 180° C., and preferably to between 140° C. and 180° C., on entry to the combustor.

The heat exchanger may be arranged to transfer heat from the oil to the fuel so as to raise the fuel temperature to at least 120° C., 125° C., 130° C., 135° C., 140° C., 145° C., 150° C., 155° C., 160° C., 165° C., 170° C., 175° C., 180° C., 185° C., 190° C., 195° C. or 200° C. on entry to the combustor, or to a fuel temperature in a range defined between any two of those values.

The modulator valve may be arranged to modulate the flow of fuel along the fuel recirculation line such that a ratio of fuel mass recirculated to fuel mass delivered to the combustor is between 0 and 9 at cruise conditions.

The modulator valve may be arranged to modulate the flow of fuel along the fuel recirculation line such that the ratio of fuel mass returned to the tank to fuel mass delivered to the combustor is between 2.3 and 9 at cruise conditions.

The modulator valve may be arranged to modulate the flow of fuel along the fuel recirculation line such that the ratio of fuel mass returned to the tank to fuel mass delivered to the combustor is greater than 4 and less than or equal to 9 at cruise conditions.

The modulator valve may be arranged to modulate the flow of fuel along the fuel recirculation line such that the ratio of fuel mass returned to the tank to fuel mass delivered to the combustor is greater than 4 and less than or equal to 4.9 at cruise conditions.

The gas turbine engine may further comprise at least one temperature sensor on the fuel flow path and/or on the fuel recirculation line.

The modulator valve may be arranged to modulate the flow of fuel along the fuel recirculation line based at least in part on temperature data from the at least one temperature sensor.

According to a sixteenth aspect there is provided a method of operating a gas turbine engine, the gas turbine engine comprising:
  a combustor:
  a fuel-oil heat exchanger arranged to receive fuel from a fuel tank and transfer heat from the oil to the fuel so as to raise the fuel temperature to at least 120° C. on entry to the combustor;
  a fuel recirculation line arranged to recirculate at least some fuel on a fuel flow path from a first point on the fuel flow path to a second point on the fuel flow path, the second point upstream of the first point; and
  a modulator valve arranged to modulate the flow of fuel along the fuel recirculation line;
  wherein the method comprises modulating the flow of fuel along the fuel recirculation line using the modulator valve.

The method may comprise modulating the flow of fuel along the fuel recirculation line, using the modulator valve, from a first point downstream of the fuel-oil heat exchanger to a second point upstream of the fuel-oil heat exchanger.

The gas turbine engine may further comprise a fuel pump on the fuel flow path. The method may comprise modulating the flow of fuel along the fuel recirculation line, using the modulator valve, from a first point downstream of the fuel pump to a second point upstream of the fuel pump.

The fuel pump may be downstream of the fuel-oil heat exchanger on the fuel flow path.

The method may comprise supplying fuel to one or more additional aircraft and/or engine mechanisms via the fuel recirculation line.

The one or more additional aircraft and/or engine mechanisms may be or comprise one or more of a nacelle anti-icing system, actuators, bleed valves, heat management modulating valves (for example, for the engine and/or a generator system and a turbine case cooling system.

The fuel flow path may be a main fuel flow path between the fuel tank on board the aircraft and the combustor. The fuel-oil heat exchanger may be a primary fuel-oil heat exchanger located on the main fuel flow path.

The second point may be located downstream of a low-pressure fuel pump by which fuel is pumped to the gas turbine engine from the fuel tank.

The first point may be located downstream of the primary fuel-oil heat exchanger. The first point may be located downstream of a fuel pump configured to supply fuel to the combustor (i.e. a high-pressure fuel pump).

The engine may further comprise a secondary fuel-oil heat exchanger located in the main flow path (e.g., in series with the main heat exchanger). The second point may be downstream of the secondary heat exchanger.

Alternatively, the engine may further comprise a secondary fuel-oil heat exchanger with a flow line leading from the main flow path to the secondary fuel-oil heat exchanger and a flow line re-joining the main flow path from the secondary heat exchanger (e.g., such that it is in parallel with the main flow path). The second point may be located upstream of the inlet of the line leading to the secondary fuel-oil heat exchanger and the first point may be located downstream of an outlet of the line re-joining the main fuel flow path from the secondary fuel-oil heat exchanger. The second point may be upstream of the primary fuel-oil heat exchanger.

The method may comprise transferring heat from the oil to the fuel so as to raise the fuel temperature to least 140° C. on entry to the combustor.

The method may comprise transferring heat from the oil to the fuel so as to raise the fuel temperature to between 120° C. and 180° C. on entry to the combustor.

The method may comprise transferring heat from the oil to the fuel so as to raise the fuel temperature to between 140° C. and 180° C., on entry to the combustor.

The heat exchanger may be arranged to transfer heat from the oil to the fuel so as to raise the fuel temperature to at least 120° C., 125° C., 130° C., 135° C., 140° C., 145° C., 150° C., 155° C., 160° C., 165° C., 170° C., 175° C., 180° C., 185° C., 190° C., 195° C. or 200° C. on entry to the combustor, or to a fuel temperature in a range defined between any two of those values.

The method may comprise modulating the flow of fuel along the recirculation line using the modulator valve such that a ratio of fuel mass recirculated to fuel mass delivered to the combustor is between 0 and 9 at cruise conditions.

The method may comprise modulating the flow of fuel along the recirculation line using the modulator valve such that the ratio of fuel mass returned to the tank to fuel mass delivered to the combustor is between 2.3 and 9 at cruise conditions.

The method may comprise modulating the flow of fuel along the recirculation line using the modulator valve such that the ratio of fuel mass returned to the tank to fuel mass delivered to the combustor is greater than 4 and less than or equal to 9 at cruise conditions.

The method may comprise modulating the flow of fuel along the recirculation line using the modulator valve such that the ratio of fuel mass returned to the tank to fuel mass delivered to the combustor is greater than 4 and less than or equal to 4.9 at cruise conditions.

The gas turbine engine may further comprise at least one temperature sensor on the fuel flow path and/or on the fuel recirculation line.

The method may comprise modulating the flow of fuel along the fuel recirculation line, using the modulator valve, based at least in part on temperature data from the at least one temperature sensor.

The fuel recirculation features of the fifteenth and sixteenth aspect may be combined with any of the other aspects defined above or elsewhere herein. In other words, fuel may be recirculated back to the fuel tank using the modulation valve of any aspect defined above or elsewhere herein as well as recirculated as defined in the fifteenth and sixteenth aspects.

In the fifth, seventh, ninth, eleventh and thirteenth aspects:

The modulator valve may be arranged to modulate the flow of fuel along the fuel return line such that a ratio of a temperature, in Kelvin, of fuel in the fuel tank to a temperature, in Kelvin, of fuel being delivered to the combustor is less than 0.56 (e.g. at cruise conditions).

The modulator valve may be arranged to modulate the flow of fuel along the fuel return line such that the ratio of the temperature, in Kelvin, of fuel in the fuel tank to the temperature, in Kelvin, of fuel being delivered to the combustor is less than 0.53 (e.g. at cruise conditions).

The modulator valve may be arranged to modulate the flow of fuel along the fuel return line such that the ratio of the temperature, in Kelvin, of fuel in the fuel tank to the temperature, in Kelvin, of fuel being delivered to the combustor is between 0.48 and 0.56 (e.g. at cruise conditions).

The modulator valve may be arranged to modulate the flow of fuel along the fuel return line such that the ratio of the temperature, in Kelvin, of fuel in the fuel tank to the temperature, in Kelvin, of fuel being delivered to the combustor is between 0.48 and 0.53 (e.g. at cruise conditions).

The modulator valve may be arranged to modulate the flow of fuel along the fuel return line such that the ratio of the temperature, in Kelvin, of fuel in the fuel tank to the temperature, in Kelvin, of fuel being delivered to the combustor is between 0.48 and 1.00 (e.g. at cruise conditions).

The modulator valve may be arranged to modulate the flow of fuel along the fuel return line such that the ratio of the temperature, in Kelvin, of fuel in the fuel tank to the temperature, in Kelvin, of fuel being delivered to the combustor (e.g. at cruise conditions) is:
  a) between 0.48 and 0.90;
  b) between 0.48 and 0.82;
  c) between 0.56 and 1.00;
  d) between 0.56 and 0.82; or
  e) between 0.56 and 0.75.

In the Sixth, Eighth, Tenth, Twelfth and Fourteenth Aspects:

The method may comprise modulating the flow of fuel along the fuel return line using the modulator valve such that a ratio of a temperature, in Kelvin, of fuel in the fuel tank to a temperature, in Kelvin, of fuel being delivered to the combustor is less than 0.56 (e.g. at cruise conditions).

The method may comprise modulating the flow of fuel along the fuel return line using the modulator valve such that the ratio of the temperature, in Kelvin, of fuel in the fuel tank to the temperature, in Kelvin, of fuel being delivered to the combustor is less than 0.53 (e.g. at cruise conditions).

The method may comprise modulating the flow of fuel along the fuel return line using the modulator valve such that the ratio of the temperature, in Kelvin, of fuel in the fuel tank to the temperature, in Kelvin, of fuel being delivered to the combustor is between 0.48 and 0.56 (e.g. at cruise conditions).

The method may comprise modulating the flow of fuel along the fuel return line using the modulator valve such that the ratio of the temperature, in Kelvin, of fuel in the fuel tank to the temperature, in Kelvin, of fuel being delivered to the combustor is between 0.48 and 0.53 (e.g. at cruise conditions).

The method may comprise modulating the flow of fuel along the fuel return line using the modulator valve such that the ratio of the temperature, in Kelvin, of fuel in the fuel tank to the temperature, in Kelvin, of fuel being delivered to the combustor is between 0.48 and 1.00 (e.g. at cruise conditions).

The method may comprise modulating the flow of fuel along the fuel return line using the modulator valve such that the ratio of the temperature, in Kelvin, of fuel in the fuel tank to the temperature, in Kelvin, of fuel being delivered to the combustor (e.g. at cruise conditions) is:
  a) between 0.48 and 0.90;
  b) between 0.48 and 0.82;
  c) between 0.56 and 1.00;
  d) between 0.56 and 0.82; or
  e) between 0.56 and 0.75.

In the First, Third, Fifth, Seventh, Eleventh and Thirteenth Aspects:

The modulator valve may be arranged to initiate return of fuel to the fuel tank when fuel having passed through the heat exchanger is at a temperature of at least 120° C., and preferably at least 140° C.

The modulator valve may be arranged to initiate return of fuel to the fuel tank when fuel having passed through the heat exchanger is at a temperature of between 120° C. and 180° C., and preferably is at a temperature of between 140° C. and 180° C.

The modulator valve may be arranged to initiate return of fuel to the fuel tank when:
  i) an indication of an operating condition is provided; and
  ii) fuel having passed through the heat exchanger is at a temperature of at least 120° C., preferably at least 140° C.

The operating condition may be one or more of a proportion of sustainable aviation fuel (SAF) in the fuel, a thermal stability of the fuel, a coking level of the fuel, an oxygen content of the fuel and a sulphur content of the fuel.

The gas turbine engine may further comprise a sensor configured to detect one or more operating conditions.

In the Second, Fourth, Sixth, Eighth, Twelfth and Fourteenth Aspects:

The method may comprise initiating return of fuel to the fuel tank using the modulator valve when fuel having passed through the heat exchanger is at a temperature of at least 120° C., and preferably at least 140° C.

The method may comprise initiating return of fuel to the fuel tank using the modulator valve when fuel having passed through the heat exchanger is at a temperature of between 120° C. and 180° C., preferably is at a temperature of between 140° C. and 180° C.

The method may comprise initiating return of fuel to the fuel tank using the modulator valve when:
  i) an indication of an operating condition is provided; and
  ii) fuel having passed through the heat exchanger is at a temperature of at least 120° C., preferably at least 140° C.

The operating condition may be one or more of a proportion of sustainable aviation fuel (SAF) in the fuel, a thermal stability of the fuel, a coking level of the fuel, an oxygen content of the fuel and a sulphur content of the fuel.

The gas turbine engine may further comprise a sensor configured to detect one or more operating conditions. The method may comprise detecting one or more operating conditions using the sensor.

In the First, Third, Fifth, Seventh, Ninth and Thirteenth Aspects

The modulator valve may be arranged to modulate the flow of fuel along the fuel return line such that the ratio of fuel returned to the tank to fuel mass delivered to the combustor is between 0 and 9 at cruise conditions.

The modulator valve may be arranged to modulate the flow of fuel along the fuel return line such that the ratio of fuel mass returned to the tank to fuel mass delivered to the combustor is between 2.3 and 9 at cruise conditions.

The modulator valve may be arranged to modulate the flow of fuel along the fuel return line such that the ratio of fuel mass returned to the tank to fuel mass delivered to the combustor is greater than 4 and less than or equal to 9 at cruise conditions.

The modulator valve may be arranged to modulate the flow of fuel along the fuel return line such that the ratio of fuel mass returned to the tank to fuel mass delivered to the combustor is greater than 4 and less than or equal to 4.9 at cruise conditions.

In the Second, Fourth, Sixth, Eighth, Tenth, Fourteenth Aspects:

The method may comprise modulating the flow of fuel along the fuel return line using the modulator valve such that the ratio of fuel mass returned to the fuel tank to fuel mass delivered to the combustor is between 0 and 9 at cruise conditions.

The method may comprise modulating the flow of fuel along the fuel return line using the modulator valve such that the ratio of fuel mass returned to the tank to fuel mass delivered to the combustor is between 2.3 and 9 at cruise conditions.

The method may comprise modulating the flow of fuel along the fuel return line using the modulator valve such that the ratio of fuel mass returned to the tank to fuel mass delivered to the combustor is greater than 4 and less than or equal to 9 at cruise conditions.

The method may comprise modulating the flow of fuel along the fuel return line using the modulator valve such that a ratio of fuel mass returned to the tank to fuel mass delivered to the combustor is greater than 4 and less than or equal to 4.9 at cruise conditions.

In the First, Third, Fifth, Seventh, Ninth and Eleventh Aspects:

The modulator valve may be arranged to prevent return of fuel having a temperature of 180° C. or greater to the fuel tank.

The modulator valve may be arranged to prevent return of fuel to the fuel tank when a temperature of fuel in the fuel tank is at a pre-determined upper threshold temperature.

The pre-determined upper threshold temperature may be 100° C. The pre-determined upper threshold temperature may be 65° C. The pre-determined upper threshold temperature may be 55° C. The pre-determined upper threshold temperature may be 5° C.

The modulator valve may be arranged to modulate a flow of fuel along the fuel return line based at least in part on a temperature of fuel that has passed through the heat exchanger, a temperature of fuel in the fuel tank, and a quantity of fuel remaining in the tank.

The modulator valve may be arranged to modulate the flow of fuel along the fuel return line such that an equilibrium temperature of fuel in the fuel tank, once mixed with fuel returned to the tank along the fuel return line, does not exceed the pre-determined upper threshold temperature.

In the Second, Fourth, Sixth, Eighth, Tenth and Twelfth Aspects:

The method may comprise preventing return of fuel having a temperature of 180° C. or greater to the fuel tank using the modulator valve.

The method may comprise preventing return of fuel to the fuel tank using the modulator valve when a temperature of fuel in the fuel tank is at a pre-determined upper threshold temperature.

The pre-determined upper threshold temperature may be 100° C. The pre-determined upper threshold temperature may be 65° C. The pre-determined upper threshold may be 55° C. The pre-determined upper threshold temperature may be 5° C.

The method may comprise modulating a flow of fuel along the fuel return line using the modulator valve based at least in part on a temperature of fuel that has passed through the heat exchanger, a temperature of fuel in the fuel tank, and a quantity of fuel remaining in the tank.

The method may comprise modulating a flow of fuel along the fuel return line using the modulator valve such that an equilibrium temperature of fuel in the fuel tank, once mixed with fuel returned to the tank along the fuel return line, does not exceed the pre-determined upper threshold temperature.

In the First, Second, Third and Fourth Aspects:

A temperature of the fuel being delivered to the combustor (i.e. on entry to the combustor) may be a temperature of the fuel being delivered to the combustor at cruise conditions. The fuel temperatures being delivered to the combustor at cruise conditions may be defined as an average over at least 5 minutes, 10 minutes, or 30 minutes, under steady state cruise conditions. These average temperatures do not include transient spikes in temperature, which may be defined as fluctuations in temperature of the fuel during operation, often elevation of the temperature. Each fluctuation may not last more than 5 minutes.

The previous paragraph above may also be relevant to other references to the temperature of fuel on entry to the combustor.

In the First, Third, Fifth, Seventh, Ninth, Eleventh, Thirteenth and Fifteenth Aspects:

The heat exchanger may be arranged to transfer heat from the oil to the fuel so as to raise the fuel temperature to at least 120° C., and preferably to a temperature of 140° C., on entry to the combustor (i.e. the heat exchanger may be arranged to transfer heat from the oil to the fuel to raise the temperature of the fuel so that the fuel has those temperatures when it enters the combustor).

The heat exchanger may be arranged to transfer heat from the oil to the fuel so as to raise the fuel temperature to between 120° C. and 180° C., and preferably between 140° C. and 180° C., on entry to the combustor.

The heat exchanger may be arranged to transfer heat from the oil to the fuel so as to raise the fuel temperature to at least 125° C., 130° C., 135° C., 140° C., 145° C., 150° C., 155° C., 160° C., 165° C., 170° C., 175° C., 180° C., 185° C., 190° C., 195° C. or 200° C. on entry to the combustor, or to a fuel temperature in a range defined between any two of those values.

In the Second, Fourth, Sixth, Eighth, Tenth and Twelfth, Fourteenth and Sixteenth Aspects:

The method may comprise transferring heat from the oil to the fuel using the fuel-oil heat exchanger so as to raise the fuel temperature to at least 120° C., and preferably to at least 140° C., on entry to the combustor.

The method may comprise transferring heat from the oil to the fuel using the fuel-oil heat exchanger so as to raise the fuel temperature to between 120° C. and 180° C., and preferably between 140° C. and 180° C., on entry to the combustor.

The method may comprise transferring heat from the oil to the fuel so as to raise the fuel temperature to at least 125° C., 130° C., 135° C., 140° C., 145° C., 150° C., 155° C., 160° C., 165° C., 170° C., 175° C., 180° C., 185° C., 190° C., 195° C. or 200° C. on entry to the combustor, or to a fuel temperature in a range defined between any two of those values.

In First, Third, Fifth, Seventh Aspects:

The gas turbine engine may comprise a first temperature sensor located downstream of the heat exchanger; and may be configured to receive information from a second temperature sensor located in the fuel tank.

The first temperature sensor may be located in the fuel return line.

The modulator valve may be arranged to modulate the flow of fuel along the fuel return line based on temperature data from the first temperature sensor and the second temperature sensor.

In the Ninth Aspect:

The gas turbine engine may further comprise at least one temperature sensor located downstream of the heat exchanger.

The modulator valve may be arranged to initiate return of fuel to the fuel tank based at least in part on temperature data from the at least one temperature sensor located downstream of the heat exchanger.

In the Eleventh and Thirteenth Aspect:

The gas turbine engine may further comprise at least one temperature sensor located downstream of the heat exchanger; and/or the gas turbine engine may be configured to receive information from a temperature sensor located in the fuel tank.

The at least one temperature sensor located downstream of the heat exchanger may be located in the fuel return line.

The modulator valve may be arranged to modulate the flow of fuel along the fuel return line based at least in part on temperature data from the at least one temperature sensor located downstream of the heat exchanger and/or the temperature sensor located in the fuel tank.

In the Second, Fourth, Sixth, Eighth Aspects:

The gas turbine engine may comprise a first temperature sensor located downstream of the heat exchanger; and may be configured to receive information from a second temperature sensor located in the fuel tank.

The first temperature sensor may be located in the fuel return line.

The method may comprise modulating the flow of fuel along the fuel return line based on temperature data from the first temperature sensor and the second temperature sensor.

In the Tenth Aspect:

The gas turbine engine may further comprise at least one temperature sensor located downstream of the heat exchanger.

The method may comprise initiating return of fuel to the fuel tank using the modulator valve based at least in part on temperature data from the at least one temperature sensor located downstream of the heat exchanger.

In the Twelfth and Fourteenth Aspects:

The gas turbine engine may further comprise at least one temperature sensor located downstream of the heat exchanger; and/or the gas turbine engine may be configured to receive information from a temperature sensor located in the fuel tank.

The at least one temperature sensor located downstream of the heat exchanger may be located in the fuel return line.

The method may comprise modulating the flow of fuel along the fuel return line using the modulator valve based at least in part on temperature data from the at least one temperature sensor located downstream of the heat exchanger and/or the temperature sensor located in the fuel tank.

In the First, Second, Third, Fourth, Fifth, Sixth, Seventh, Eighth, Ninth, Tenth, Eleventh, Twelfth, Thirteenth and Fourteenth Aspects:

The temperature of the fuel in the fuel tank may be between −54° C. and 100° C.

The temperature of the fuel in the fuel tank may be between −54° C. and 65° C.

The temperature of the fuel in the fuel tank may be between −54° C. and 55° C.

The temperature of the fuel in the fuel tank may be between −54° C. and 5° C.

The temperature of the fuel in the fuel tank may be −54° C., −50° C., −45° C., −40° C., −35° C., −30° C., −25° C., −20° C., −15° C., −10° C., −5° C., 0° C., 5° C., 10° C., 15° C., 20° C., 25° C., 30° C., 35° C., 40° C., 45° C., 50° C., 55° C., 60° C., 65° C., 70° C., 75° C., 80° C., 85° C., 90° C., 95° C., 100° C. or within any range defined between any two of those values.

In the First, Third, Fifth, Seventh, Ninth, Eleventh, Thirteenth Aspects:

The modulator valve may be arranged to modulate the flow of fuel along the fuel return line based at least in part on a quantity of fuel remaining in the fuel tank. The quantity of fuel remaining in the fuel tank may be a mass of fuel remaining in the fuel tank.

The modulator valve may be arranged to modulate the flow of fuel along the fuel return line based at least in part on a temperature of fuel that has passed through the heat exchanger, a temperature of fuel in the fuel tank, and a quantity of fuel remaining in the fuel tank.

The modulator valve may be arranged to modulate the flow of fuel along the fuel return line such that an equilibrium temperature of fuel in the fuel tank following the return of fuel to the fuel tank along the fuel return line does not exceed a pre-determined upper threshold temperature for fuel in the fuel tank.

In the Second, Fourth, Sixth, Eighth, Tenth, Twelfth, Fourteenth Aspects:

The method may comprise modulating the flow of fuel along the fuel return line using the modulator valve based at least in part on a quantity of fuel remaining in the fuel tank. The quantity of fuel remaining in the fuel tank may be a mass of fuel remaining in the fuel tank.

The method may comprise modulating the flow of fuel along the fuel return line using the modulator valve based at least in part on a temperature of fuel that has passed through the heat exchanger, a temperature of fuel in the fuel tank, and a quantity of fuel remaining in the fuel tank.

The method may comprise modulating the flow of fuel along the fuel return line using the modulator valve such that an equilibrium temperature of fuel in the fuel tank following the return of fuel to the fuel tank along the fuel return line does not exceed a pre-determined upper threshold temperature for fuel in the fuel tank.

As noted elsewhere herein, the present disclosure may apply to any relevant configuration of gas turbine engine. Such a gas turbine engine may be, for example, a turbofan gas turbine engine, an open rotor gas turbine engine (in which the propeller is not surrounded by a nacelle), a turboprop engine or a turbojet engine. Any such engine may or may not be provided with an afterburner. Such a gas turbine engine may be, for example, configured for land or marine-based power generation applications.

A gas turbine engine in accordance with any aspect of the present disclosure may comprise an engine core comprising a turbine, a combustor, a compressor, and a core shaft connecting the turbine to the compressor. Such a gas turbine engine may comprise a fan (having fan blades). Such a fan may be located upstream of the engine core. Alternatively, in some examples, the gas turbine engine may comprise a fan located downstream of the engine core, for example where the gas turbine engine is an open rotor or a turboprop engine (in which case the fan may be referred to as a propeller).

Where the gas turbine engine is an open rotor or a turboprop engine, the gas turbine engine may comprise two contra-rotating propeller stages attached to and driven by a free power turbine via a shaft. The propellers may rotate in opposite senses so that one rotates clockwise and the other anti-clockwise around the engine's rotational axis. Alternatively, the gas turbine engine may comprise a propeller stage and a guide vane stage configured downstream of the propeller stage. The guide vane stage may be of variable pitch. Accordingly, high pressure, intermediate pressure, and free power turbines respectively may drive high and intermediate pressure compressors and propellers by suitable interconnecting shafts. Thus, the propellers may provide the majority of the propulsive thrust.

Where the gas turbine engine is an open rotor or a turboprop engine, one or more of the propellor stages may be driven by a gearbox. The gearbox may be of the type described herein.

An engine according to the present disclosure may be a turbofan engine. Such an engine may be a direct-drive turbofan engine in which the fan is directly connected to the fan-drive turbine, for example without a gearbox, via a core shaft. In such a direct-drive turbofan engine, the fan may be said to rotate at the same rotational speed as the fan-drive turbine. Purely by way of example, the fan-drive turbine may be a first turbine, the core shaft may be a first core shaft, and the gas turbine engine may further comprise a second turbine and a second core shaft connecting the second turbine to the compressor. The second turbine, the compressor, and second core shaft may be arranged to rotate at a higher rotational speed than the first core shaft. In such an arrangement, the second turbine may be positioned axially upstream of the first turbine.

An engine according to the present disclosure may be a geared turbofan engine. In such an arrangement, the engine has a fan that is driven via a gearbox. Accordingly, such a gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. Such a gearbox may be a single stage. Alternatively, such a gearbox may be a compound gearbox, for example a compound planetary gearbox (which may have the input on the sun gear and the output on the ring gear, and thus be referred to as a "compound star" gearbox), for example having two stages of reduction.

The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a reduction ratio in the range of from 3.1 or 3.2 to 3.8. Purely by way of further example, the gearbox may be a "star" gearbox having a reduction ratio in the range 3.0 to 3.1. Purely by way of further example, the gearbox may be a "planetary" gearbox having a reduction ratio in the range 3.6 to 4.2. In some arrangements, the gear ratio may be outside these ranges.

In any gas turbine engine as described and/or claimed herein, fuel of a given composition or blend is provided to a combustor, which may be provided downstream of the fan and compressor(s) with respect to the flowpath (for example axially downstream). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other. For example, the gas turbine engine may be a direct-drive turbofan gas turbine engine comprising 13 or 14 compressor stages (in addition to the fan). Such an engine may, for example, comprise 3 stages in the first (or "low pressure") compressor and either 10 or 11 stages in the second (or "high pressure") compressor. By way of further example, the gas turbine engine may be a "geared" gas turbine engine (in which the fan is driven by a first core shaft via a reduction gearbox) comprising 11, 12 or 13 compressor stages (in addition to the fan). Such an engine may comprise 3 or 4 stages in the first (or "low pressure") compressor and 8 or 9 stages in the second (or "high pressure") compressor. By way of further example, the gas turbine engine may be a "geared" gas turbine engine having 4 stages in the first (or "low pressure") compressor and 10 stages in the second (or "high pressure") compressor.

The or each turbine (for example the first turbine and second turbine as described above) may comprise any number of stages, for example multiple stages. Each stage may comprise a row of rotor blades and a row of stator vanes, or vice versa, as required. The respective rows of rotor blades and stator vanes may be axially offset from each other. The second (or "high pressure") turbine may comprise 2 stages in any arrangement (for example regardless of whether it is a geared or direct-drive engine). The gas turbine engine may be a direct-drive gas turbine engine comprising a first (or "low pressure") turbine having 5, 6 or 7 stages. Alternatively, the gas turbine engine may be a "geared" gas turbine engine comprising a first (or "low pressure") turbine having 3 or 4 stages.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32 or 0.29 to 0.30. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 140 cm, 170 cm, 180 cm, 190 cm, 200 cm, 210 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches), 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 210 cm to 240 cm, or 250 cm to 280 cm, or 320 cm to 380 cm. Purely by way of non-limitative example, the fan diameter may be in the range of from 170 cm to 180 cm, 190 cm to 200 cm, 200 cm to 210 cm, 210 cm to 230 cm, 290 cm to 300 cm or 340 cm to 360 cm.

The rotational speed of the fan may vary in use. Generally, the rotational speed is lower for fans with a higher diameter. Purely by way of non-limitative example, the rotational speed of the fan at cruise conditions may be less than 3500 rpm, for example less than 2600 rpm, or less than 2500 rpm, or less than 2300 rpm. Purely by way of further non-limitative example, the rotational speed of the fan at cruise conditions for a "geared" gas turbine engine having a fan diameter in the range of from 200 cm to 210 cm may be in the range of from 2750 to 2900 rpm. Purely by way of further non-limitative example, the rotational speed of the fan at cruise conditions for a "geared" gas turbine engine having a fan diameter in the range of from 210 cm to 230 cm may be in the range of from 2500 to 2800 rpm. Purely by way of further non-limitative example, the rotational speed of the fan at cruise conditions for a "geared" gas turbine engine having a fan diameter in the range of from 340 cm to 360 cm may be in the range of from 1500 to 1800 rpm. Purely by way of further non-limitative example, the rotational speed of the fan at cruise conditions for a direct drive engine having a fan diameter in the range of from 190 cm to 200 cm may be in the range of from 3600 to 3900 rpm. Purely by way of further non-limitative example, the rotational speed of the fan at cruise conditions for a direct drive engine having a fan diameter in the range of from 300 cm to 340 cm may be in the range of from 2000 to 2800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$ where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3 (for example for a geared gas turbine engine).

Gas turbine engines in accordance with the present disclosure may have any desired bypass ratio (BPR), where the bypass ratio is defined as the ratio of the mass flow rate of the flow through the bypass duct to the mass flow rate of the flow through the core. In some arrangements the bypass ratio at cruise conditions may be greater than (or on the order of) any of the following: 9. 9.5, 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio at cruise conditions may be in an inclusive range bounded by any two of the values in the previous sentence (i.e. the values may form upper or lower bounds), for example in the range of from 12 to 16, 13 to 15, or 13 to 14. Purely by way of non-limitative example, the bypass ratio at cruise conditions of a direct-drive gas turbine engine according to the present disclosure may be in the range of from 9:1 to 11:1. Purely by way of further non-limitative example, the bypass ratio at cruise conditions of a geared gas turbine engine according to the present disclosure may be in the range of from 12:1 to 15:1 The bypass duct may be at least substantially annular. The bypass duct may be radially outside the core engine. The radially outer surface of the bypass duct may be defined by a nacelle and/or a fan case.

The overall pressure ratio (OPR) of a gas turbine engine as described and/or claimed herein may be defined as the ratio of the stagnation pressure at the exit of the highest pressure compressor (before entry into the combustor) to the stagnation pressure upstream of the fan. By way of non-limitative example, the overall pressure ratio of a gas turbine engine as described and/or claimed herein at cruise conditions may be greater than (or on the order of) any of the following: 35, 40, 45, 50, 55, 60, 65, 70, 75.

The overall pressure ratio may be in an inclusive range bounded by any two of the values in the previous sentence (i.e. the values may form upper or lower bounds), for example in the range of from 50 to 70. Purely by way of non-limitative example, the overall pressure ratio at cruise conditions of a geared gas turbine engine having a fan diameter in the range of from 200 cm to 210 cm may be in the range of from to 45. Purely by way of non-limitative example, the overall pressure ratio at cruise conditions of a geared gas turbine engine having a fan diameter in the range of from 210 cm to 230 cm may be in the range of from 45 to 55. Purely by way of non-limitative example, the overall pressure ratio at cruise conditions of a geared gas turbine engine having a fan diameter in the range of from 340 cm to 360 cm may be in the range of from 50 to 60. Purely by way of non-limitative example, the overall pressure ratio at cruise conditions of a direct-drive gas turbine engine having a fan diameter in the range of from 300 cm to 340 cm may be in the range of from 50 to 60.

Specific thrust of an engine may be defined as the net thrust of the engine divided by the total mass flow through the engine. In some examples, specific thrust may depend, for a given thrust condition, upon the specific composition of fuel provided to the combustor. At cruise conditions, the specific thrust of an engine described and/or claimed herein may be less than (or on the order of) any of the following: 110 $Nkg^{-1}s$, 105 $Nkg^{-1}s$, 100 Nkg's, 95 Nkg-s, 90 Nkg-s, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 Nkg-'s. Such engines may be particularly efficient in comparison with conventional gas turbine engines. Purely by way of non-limitative example, the specific thrust of a geared gas turbine engine having a fan diameter in the range of from 200 cm to 210 cm may be in the range of from 90 $Nkg^{-1}s$ to 95 $Nkg^{-1}s$. Purely by way of non-limitative example, the specific thrust of a geared gas turbine engine having a fan diameter in the range of from 210 cm to 230 cm may be in the range of from 80 $Nkg^{-1}s$ to 90 $Nkg^{-1}s$. Purely by way of non-limitative example, the specific thrust of a geared gas turbine engine having a fan diameter in the range of from 340 cm to 360 cm may be in the range of from 70 $Nkg^{-1}s$ to 90 $Nkg^{-1}s$. Purely by way of non-limitative example, the specific thrust of a direct drive gas turbine engine having a fan diameter in the range of from 300 cm to 340 cm may be in the range of from 90 $Nkg^{-1}s$ to 120 $Nkg^{-1}s$.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 100 kN, 110 kN, 120 kN, 130 kN, 135 kN, 140 kN, 145 kN, 150 kN, 155 kN, 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of non-limitative example, a gas turbine as described and/or claimed herein may be capable of producing a maximum thrust in the range of from 155 kN to 170 kN, 330 kN to 420 kN, or 350 kN to 400 kN. Purely by way of non-limitative example, the maximum thrust of a geared gas turbine engine having a fan diameter in the range of from 200 cm to 210 cm may be in the range of from 140 kN to 160 kN. Purely by way of non-limitative example, the maximum thrust of a geared gas turbine engine having a fan diameter in the range of from 210 cm to 230 cm may be in the range of from 150 kN to 200 kN. Purely by way of non-limitative example, the maximum thrust of a geared gas turbine engine having a fan diameter in the range of from 340 cm to 360 cm may be in the range of from 370 kN to 500 kN. Purely by way of non-limitative example, the maximum thrust of a direct drive gas turbine engine having a fan diameter in the range of from 300 cm to 340 cm may be in the range of from 370 kN to 500 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. In some examples, TET may depend, for a given thrust condition, upon the specific composition of fuel provided to the combustor. At cruise conditions, the TET may be at least (or on the order of) any of the following: 1400K, 1450K, 1500K, 1520K, 1530K, 1540K, 1550K, 1600K or 1650K. The TET at cruise conditions may be in an inclusive range bounded by any two of the values in the previous sentence (i.e. the values may form upper or lower bounds), for example 1530K to 1600K. Thus, purely by way of non-limitative example, the TET at cruise conditions of a geared gas turbine engine having a fan diameter in the range of from 200 cm to 210 cm may be in the range of from 1540K to 1600K. Purely by way of non-limitative example, the TET at cruise conditions of a geared gas turbine engine having a fan diameter in the range of from 210 cm to 230 cm may be in the range of from 1590K to 1650K. Purely by way of non-limitative example, the TET at cruise conditions of a geared gas turbine engine having a fan diameter in the range of from 340 cm to 360 cm may be in the range of from 1600K to 1660K. Purely by way of non-limitative example, the TET at cruise conditions of a direct drive gas turbine engine having a fan diameter in the range of from 300 cm to 340 cm may be in the range of from 1590K to 1650K. Purely by way of non-limitative example, the TET at cruise conditions of a direct drive gas turbine engine having a fan diameter in the range of from 300 cm to 340 cm may be in the range of from 1570K to 1630K.

The maximum TET in use of the engine may be, for example, at least (or on the order of) any of the following:

1700K, 1750K, 1800K, 1850K, 1900K, 1950K, 2000K, 2050K, or 2100K. The maximum TET may be in an inclusive range bounded by any two of the values in the previous sentence (i.e. the values may form upper or lower bounds), for example in the range of from 1800K to 1950K, or 1900K to 2000K. Thus, purely by way of non-limitative example, the maximum TET of a geared gas turbine engine having a fan diameter in the range of from 200 cm to 210 cm may be in the range of from 1890K to 1960K. Purely by way of non-limitative example, the maximum TET of a geared gas turbine engine having a fan diameter in the range of from 210 cm to 230 cm may be in the range of from 1890K to 1960K. Purely by way of non-limitative example, the maximum TET of a geared gas turbine engine having a fan diameter in the range of from 340 cm to 360 cm may be in the range of from 1890K to 1960K. Purely by way of non-limitative example, the maximum TET of a direct drive gas turbine engine having a fan diameter in the range of from 300 cm to 340 cm may be in the range of from 1935K to 1995K. Purely by way of non-limitative example, the maximum TET of a direct drive gas turbine engine having a fan diameter in the range of from 300 cm to 340 cm may be in the range of from 1890K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre composite. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades. Where the fan blades have a carbon fibre composite body, there may be 16 or 18 fan blades. Where the fan blades have a metallic body (for example aluminium-lithium or titanium-alloy), there may be 18, 20 or 22 fan blades.

As used herein, the terms idle, taxi, take-off, climb, cruise, descent, approach, and landing (or one or more portions thereof) have the conventional meaning and would be readily understood by the skilled person. Thus, for a given gas turbine engine for an aircraft, the skilled person would immediately recognise each term to refer to the entirety, or one or more portions, of an operating phase of the engine within a given mission of an aircraft to which the gas turbine engine is designed to be attached.

In this regard, ground idle may refer to an operating phase of the engine where the aircraft is stationary and in contact with the ground, but where there is a requirement for the engine to be running. During idle, the engine may be producing between 3% and 9% of the available thrust of the engine. In further non-limitative examples, the engine may be producing between 5% and 8% of available thrust. In further non-limitative examples, the engine may be producing between 6% and 7% of available thrust. Taxi may refer to an operating phase of the engine where the aircraft is being propelled along the ground by the thrust produced by the engine. During taxi, the engine may be producing between 5% and 15% of available thrust. In further non-limitative examples, the engine may be producing between 6% and 12% of available thrust. In further non-limitative examples, the engine may be producing between 7% and 10% of available thrust. Take-off may refer to an operating phase of the engine where the aircraft is being propelled by the thrust produced by the engine. At an initial stage within the take-off phase, the aircraft may be propelled whilst the aircraft is in contact with the ground. At a later stage within the take-off phase, the aircraft may be propelled whilst the aircraft is not in contact with the ground. During take-off, the engine may be producing between 90% and 100% of available thrust. In further non-limitative examples, the engine may be producing between 95% and 100% of available thrust. In further non-limitative examples, the engine may be producing 100% of available thrust.

Climb may refer to an operating phase of the engine where the aircraft is being propelled by the thrust produced by the engine. During climb, the engine may be producing between 75% and 100% of available thrust. In further non-limitative examples, the engine may be producing between 80% and 95% of available thrust. In further non-limitative examples, the engine may be producing between 85% and 90% of available thrust. In this regard, climb may refer to an operating phase within an aircraft flight cycle between take-off and the arrival at cruise conditions, the arrival at cruise conditions thus defining the onset of the cruise phase, or a portion thereof, of the aircraft flight. Additionally or alternatively, climb may refer to a nominal point in, or one or more nominal periods during, an aircraft flight cycle between take-off and landing, where a relative increase in altitude is required, which may require an additional thrust demand of the engine.

As used herein, cruise conditions, which may define the cruise phase (or a portion thereof) of the aircraft flight, have the conventional meaning and would be readily understood by the skilled person. In some examples, for a given gas turbine engine for an aircraft, cruise conditions may refer to the operating point of the engine at mid-cruise of a given mission (which may be referred to in the industry as the "economic mission") of an aircraft to which the gas turbine engine is designed to be attached. In this regard, mid-cruise may be regarded as the point in an aircraft flight cycle at which 50% of the total fuel that is burned between top of climb and start of descent has been burned (which may be approximated by the midpoint—in terms of time and/or distance—between top of climb and start of descent). Cruise conditions may thus define an operating point, phase, or portion thereof, of the flight that provides a thrust that would ensure steady state operation (i.e. maintaining a constant altitude and/or a constant Mach Number), or at least a substantially steady state operation (i.e. maintaining an at least substantially constant altitude and/or an at least substantially constant Mach Number) of an aircraft to which it is designed to be attached, taking into account the number of engines provided to that aircraft. For example, where an engine is designed to be attached to an aircraft that has two engines of the same type, at cruise conditions the engine may provide half of the total thrust that would be required for steady state operation, or at least a substantially steady state operation, of that aircraft at mid-cruise.

In other words, for a given gas turbine engine for an aircraft, cruise conditions may be defined as the operating point of the engine that provides a specified thrust (required to provide—in combination with any other engines on the aircraft—a steady state operation, or at least a substantially steady state operation, of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions may be clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to a forward Mach number of 0.8 and standard atmospheric conditions (according to the International Standard Atmosphere) at an altitude of 35000 ft (10668 m). At such cruise conditions, the engine may provide a known required net thrust level. The known required net thrust level is, of course, dependent on the engine and its intended application and may be, for example, a value in the range of from 20 kN to 40 kN.

Purely by way of further example, the cruise conditions may correspond to a forward Mach number of 0.85 and standard atmospheric conditions (according to the International Standard Atmosphere) at an altitude of 38000 ft (11582 m). At such cruise conditions, the engine may provide a known required net thrust level. The known required net thrust level is, of course, dependent on the engine and its intended application and may be, for example, a value in the range of from 35 kN to 65 kN.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

Furthermore, the skilled person would immediately recognise either or both of descent and approach to refer to an operating phase within an aircraft flight cycle between cruise and landing of the aircraft, with approach in particular forming part of the landing and take-off (LTO) phase. During either or both of descent and approach, the engine may be producing between 0% and 50% of available thrust. In further non-limitative examples, the engine may be producing between 25% and 40% of available thrust. In further non-limitative examples, the engine may be producing between 30% and 35% of available thrust. Additionally or alternatively, descent may refer to a nominal point in an aircraft flight cycle between take-off and landing, where a relative decrease in altitude is required, and which may require a reduced thrust demand of the engine.

According to an aspect, there is provided an aircraft comprising a gas turbine engine as described and/or claimed herein. The aircraft according to this aspect is the aircraft for which the gas turbine engine has been designed to be attached. Accordingly, cruise conditions according to this aspect may correspond to an operating point, phase, or portion thereof, of the aircraft flight, as defined elsewhere herein.

According to an aspect, there is provided a method of operating a gas turbine engine as described and/or claimed herein. The operation may be at any suitable condition, which may be as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at any suitable condition, for example the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter contained or described herein may be applied to any aspect and/or combined with any other feature or parameter contained or described herein.

Except where mutually exclusive, any parameter or value contained or described herein may be applied to and/or combined with any one or more further parameters and/or or values contained or described herein. For example, a first parameter or value contained or described herein (for example, parameter A) may be applied to and/or combined with any one or more further parameters and/or values contained or described herein (for example, any one or more of parameter B; parameter C; and parameter D, and so on) to express a product of their relationship. For example, the Skilled Person would understand that where parameter A is disclosed in separation to parameter B, a product of their relationship may be expressed as, for example, A/B, B/A, B*A, or any such further application, combination, or function of parameter A relative to parameter B, as required.

BRIEF DESCRIPTION OF THE DRAWINGS

Embodiments will now be described by way of example only, with reference to the Figures, in which:

FIG. 8 to FIG. 13 illustrate example methods of operating a gas turbine engine;

DETAILED DESCRIPTION OF THE DISCLOSURE

Figure 1:
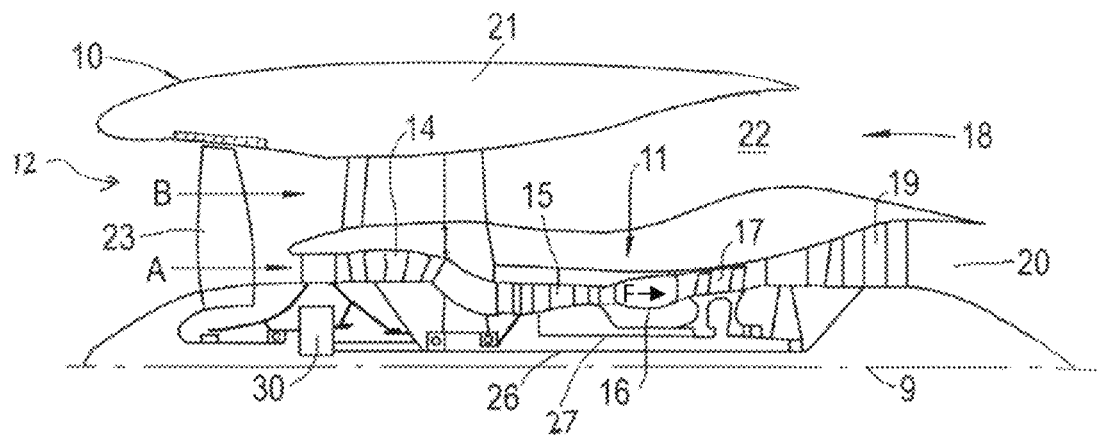
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel F and the mixture is combusted. The combustion equipment 16 may be referred to as the combustor 16, with the terms "combustion equipment 16" and "combustor 16" used interchangeably herein. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally acts to impart increased pressure to the bypass airflow B flowing through the bypass duct 22, such that the bypass airflow B is exhausted through the bypass exhaust nozzle 18 to generally provide the majority of the propulsive thrust. The epicyclic gearbox 30 is a reduction gearbox.

Figure 2:
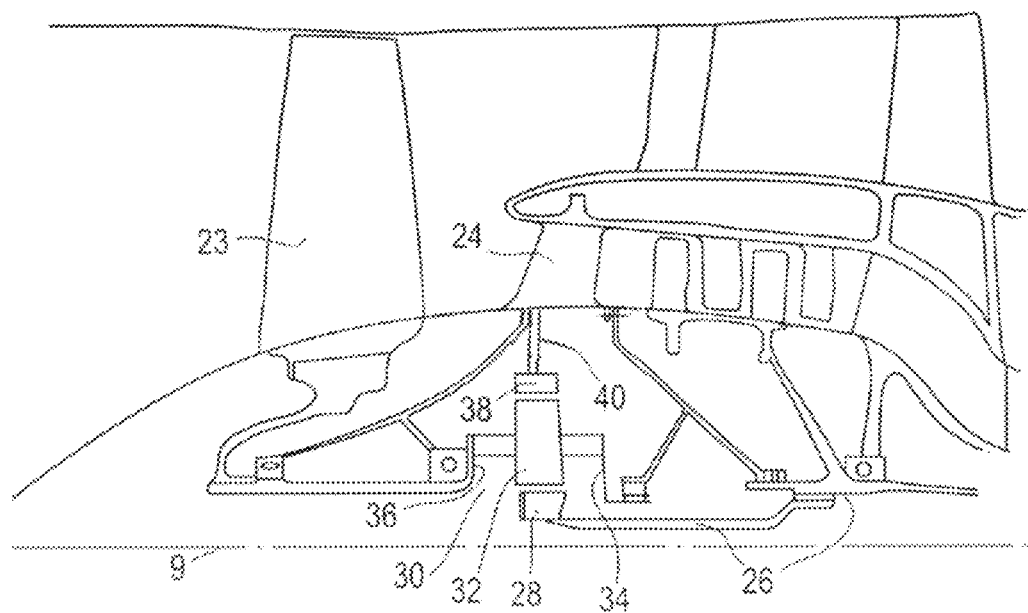
FIG. 2 is a close up sectional side view of an upstream portion of a geared gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
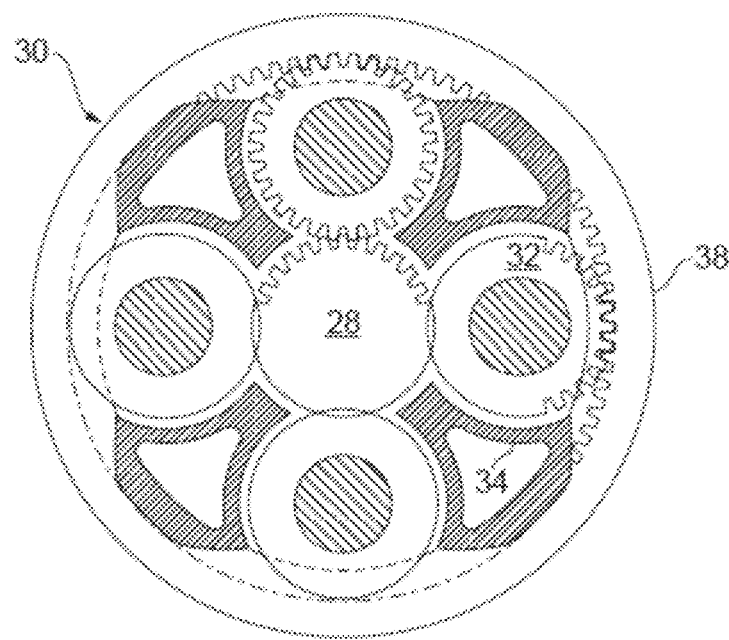
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

By way of further example, other gas turbine engines to which the present disclosure may be applied may have no gearbox for the main shaft(s), instead being direct drive engines. A cross-sectional view of one such engine is shown in FIG. 4.

Figure 4:
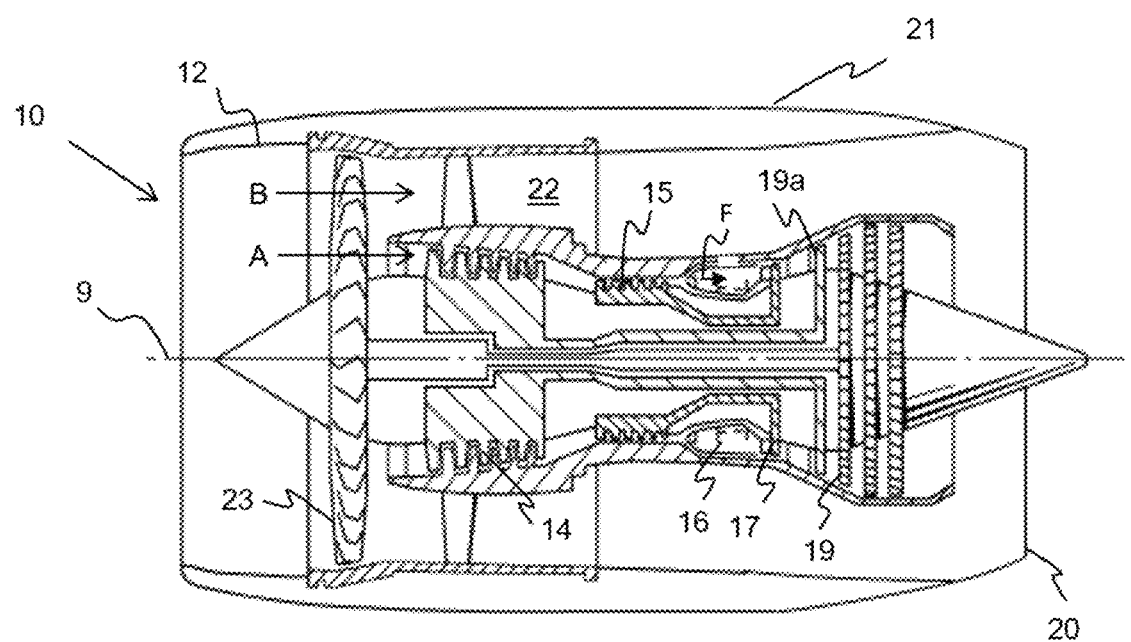
FIG. 4 is a close up sectional side view of an upstream portion of a direct drive gas turbine engine.

With reference to FIG. 4, a gas turbine engine is generally indicated at 10, having a principal rotational axis 9. The engine 10 comprises, in axial flow series, an air intake 12, a propulsive fan 23, an intermediate pressure compressor 14, a high pressure compressor 15, combustion equipment 16, a high pressure turbine 17, an intermediate pressure turbine 19a, a low-pressure turbine 19 and an exhaust nozzle 20. A nacelle 21 surrounds the engine 10 and defines both the intake 12 and the exhaust nozzle 20.

In use, air entering the intake 12 is accelerated by the fan 23 to produce two air flows: a core airflow A and a bypass airflow B. The core airflow A flows into the intermediate pressure compressor 14, and the bypass air flow B passes through a bypass duct 22 to provide propulsive thrust. The intermediate pressure compressor 14 compresses the airflow A before delivering that air to the high pressure compressor 15 where further compression takes place.

The compressed air exhausted from the high-pressure compressor 15 is directed into the combustion equipment 16 where it is mixed with fuel F and the mixture is combusted. The combustion equipment 16 may be referred to as the combustor 16, with the terms "combustion equipment 16" and "combustor 16" used interchangeably herein. The resultant hot combustion products then expand through, and thereby drive, the high, intermediate, and low-pressure turbines 17, 19a, 19 before being exhausted through the nozzle 20 to provide additional propulsive thrust. The high 17, intermediate 19a and low 19 pressure turbines drive respectively the high pressure compressor 15, intermediate pressure compressor 14 and fan 23, each by a suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The fuel F provided to the combustion equipment 16 may comprise a fossil-based hydrocarbon fuel, such as Kerosene. Thus, the fuel F may comprise molecules from one or more of the chemical families of n-alkanes, iso-alkanes, cycloalkanes, and aromatics. Additionally or alternatively, when blended with, mixed with, or replaced by an alternative fuel, the fuel F may comprise renewable hydrocarbons produced from biological or non-biological resources, otherwise known as sustainable aviation fuel (SAF). In each of the provided examples, the fuel F may comprise one or more trace elements including, for example, sulphur, nitrogen, oxygen, inorganics, and metals.

SAF is understood by the Skilled Person to refer to, for example, a biofuel, renewable aviation fuel, renewable jet fuel, alternative fuel or biojet fuel, produced from biological or non-biological resources. SAF is understood to be commonly synthesised from carbon-containing gasses drawn out of the atmosphere and/or captured from industrial processes; or from a wide range of sustainable feedstocks such as, for example, waste oil and fats; municipal solid waste; cellulosic waste (such as corn stalks); cover crops such as camelina, *carinata*, and pennycress; non-biogenic alternative fuels: jatropha; halophytes and algae, rather than from fossil-based hydrocarbons. SAF is understood as not encompassing fossil fuels.

Functional performance of a given fuel composition, or blend of fuel F for use in a given mission, may be defined, at least in part, by the ability of the fuel to service the Brayton cycle of the gas turbine engine 10. Parameters defining functional performance may include, for example, specific energy; energy density; thermal stability; and, emissions including gaseous and/or particulate matter. In this regard, particulate matter emissions may include soot particles created by the combustion of said fuel F, also known as non-volatile particulate matter (nvPM). Any reference herein to soot or smoke may apply equally to other types of particulate matter emissions known within the art. Gaseous emissions may include any one or more of nitrogen oxides ($NO_X$); carbon monoxide (CO); carbon dioxide ($CO_2$); unburned hydrocarbons (UHC); sulphur oxides (SO) including, for example, sulphur dioxide ($SO_2$) and/or sulphur trioxide ($SO_3$); and, volatile organic compounds (VOC) created by the combustion of said fuel F. Any reference herein to gaseous emissions may apply equally to other types of gaseous emissions known within the art.

A relatively higher specific energy (i.e. energy per unit mass), expressed as MJ/kg, may at least partially reduce take-off weight, thus potentially providing a relative improvement in fuel efficiency. A relatively higher energy density (i.e. energy per unit volume), expressed as MJ/L, may at least partially reduce take-off fuel volume, which may be particularly important for volume-limited missions or military operations involving refuelling. A relatively higher thermal stability (i.e. inhibition of fuel to degrade or coke under thermal stress) may permit the fuel to sustain elevated temperatures in the engine and fuel injectors, thus potentially providing relative improvements in combustion efficiency. Reduced emissions, including particulate matter, may permit reduced contrail formation, whilst reducing the environmental impact of a given mission. Other properties of the fuel may also be key to functional performance. For example, a relatively lower freeze point (° C.) may allow long-range missions to optimise flight profiles; minimum aromatic concentrations (%) may ensure sufficient swelling of certain materials used in the construction of o-rings and seals that have been previously exposed to fuels with high aromatic contents; and, a maximum surface tension (mN/m) may ensure sufficient spray break-up and atomisation of the fuel.

The ratio of the number of hydrogen atoms to the number of carbon atoms in a molecule may influence the specific energy of a given composition, or blend of fuel. Fuels with higher ratios of hydrogen atoms to carbon atoms may have higher specific energies in the absence of bond strain. For example, fossil-based hydrocarbon fuels may comprise molecules with approximately 7 to 18 carbons, with a significant portion of a given composition stemming from molecules with 9 to 15 carbons, with an average of 12 carbons.

A number of sustainable aviation fuel blends have been approved for use. For example, some approved blends comprise blend ratios of up to 10% sustainable aviation fuel, whilst other approved blends comprise blend ratios of between 10% and 50% sustainable aviation fuel (the remainder comprising one or more fossil-based hydrocarbon fuels, such as Kerosene), with further compositions awaiting approval. However, there is an anticipation in the aviation industry that sustainable aviation fuel blends comprising up to (and including) 100% sustainable aviation fuel (SAF) will be eventually approved for use. Any reference to "SAF" herein may be a fuel that is 100% SAF or a fuel that comprises SAF, e.g. is a SAF blend.

Sustainable aviation fuels may comprise one or more of n-alkanes, iso-alkanes, cyclo-alkanes, and aromatics, and may be produced, for example, from one or more of synthesis gas (syngas); lipids (e.g. fats, oils, and greases); sugars; and alcohols. Thus, sustainable aviation fuels may comprise either or both of a lower aromatic and sulphur content, relative to fossil-based hydrocarbon fuels. Additionally or alternatively, sustainable aviation fuels may comprise either or both of a higher iso-alkane and cyclo-alkane content, relative to fossil-based hydrocarbon fuels. In some examples, sustainable aviation fuels may comprise either or both of a density of between 90% and 98% that of kerosene and a calorific value of between 101% and 105% that of kerosene.

In some examples, the sustainable aviation fuel(s), or blend(s) provided to the combustion equipment 16 may be relatively lower in aromatic and/or other non-paraffinic content than that of kerosene. The sustainable aviation fuel may comprise an aromatic content of e.g. 30%, 20%, 15%, 10%, 8%, 5%, or less than 5%; e.g. 4%, 3%, 2%, 1%, or less than 1%; e.g. 0.75%, 0.5%, 0.25%, or less than 0.25%; e.g. 0.2%, 0.1%, or less than 0.1%; e.g. 0.01%, 0.001%, or 0%. The aromatic content of the sustainable aviation fuel may be in an inclusive figure or range bounded by or within any two of the values in the previous sentence (i.e. the values may form upper or lower bounds), e.g. 13.5%, 8.5%, 2.5%, 0.35%, 0.15%, 0.05%, 0.005%, or 0%; or 0% to 0.75%, 0% to 0.5%, or 0.1% to 0.25%; or 0.15% to 0.65%, 0.35% to 0.55%, or 0.035% to 0.055%; according to one or more of preference, fuel stock or supplier, and compositional variation therein.

Owing at least in part to the molecular structure of sustainable aviation fuels, sustainable aviation fuels may provide benefits including, for example, one or more of a higher specific energy (despite, in some examples, a lower energy density); higher specific heat capacity; higher thermal stability; higher lubricity; lower viscosity; lower surface tension; lower freeze point; lower soot emissions: lower $NO_X$; and, lower $CO_2$ emissions, relative to fossil-based hydrocarbon fuels (e.g. when combusted in the combustion equipment 16). Accordingly, relative to fossil-based hydrocarbon fuels, such as Kerosene, sustainable aviation fuels may lead to either or both of a relative decrease in specific fuel consumption, and a relative decrease in maintenance costs.

Figure 5:
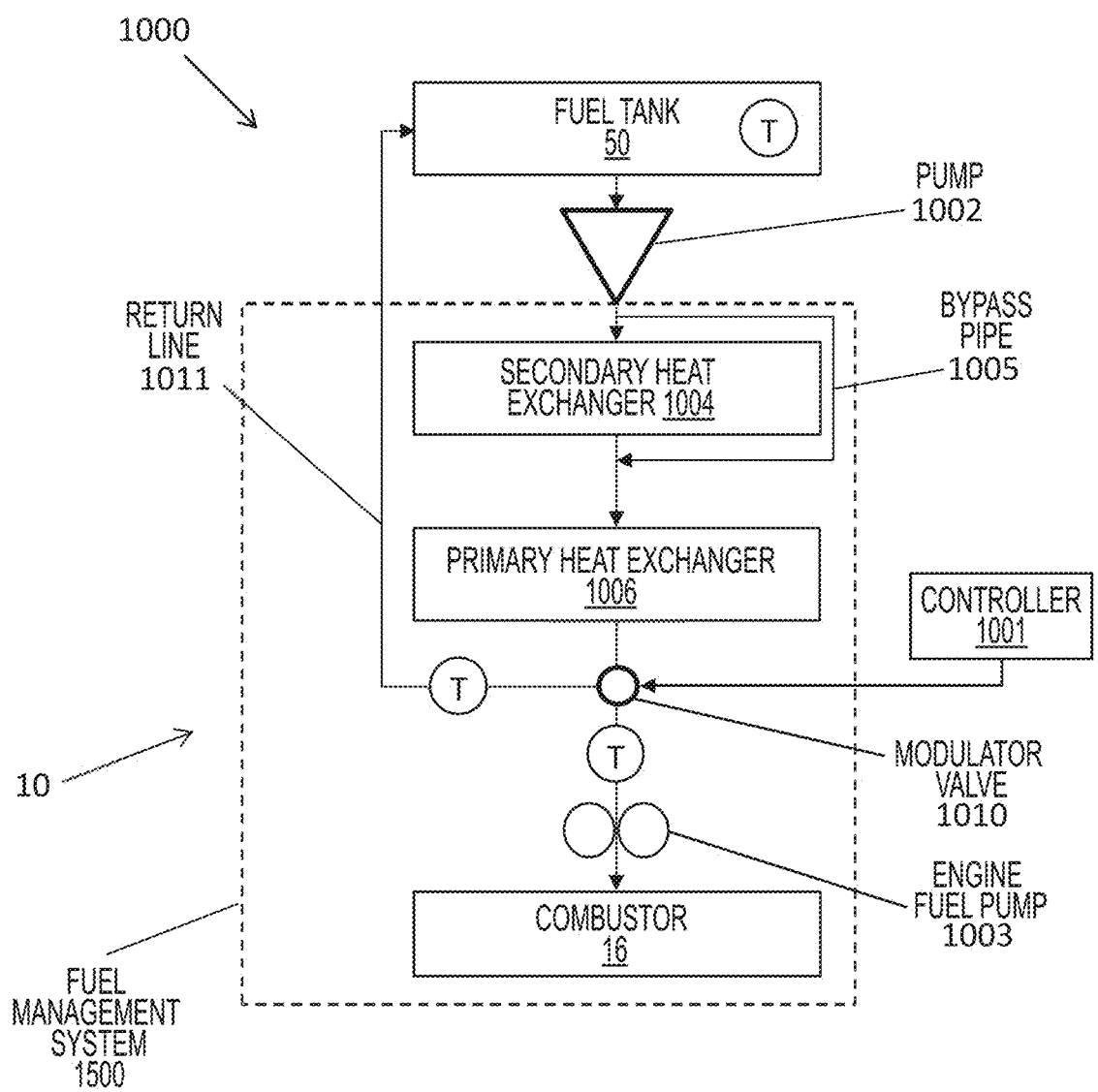
FIG. 5 is a schematic representation of an example fuel system comprising a fuel return line.

An example fuel system 1000 comprising a fuel flow path from the fuel tank 50 to the combustor 16 of the gas turbine engine 10 of the aircraft 1 is shown schematically in FIG. 5. In the example shown, the engine 10 comprises a gearbox 30 as shown in FIGS. 1 to 3 (it may however be used in conjunction with other gas turbine engines, including those with a direct drive architecture). Fuel system 1000 comprises both the fuel supply system (comprising the fuel tank 50 and the pump 1002) which supplies fuel to the engine and the fuel management system 1500 (which operates within the engine) of the aircraft. The fuel management system 1500 manages fuel temperature as well as fuel flow, directing the fuel via one or more heat exchangers 1004, 1006 of the engine's heat exchange system.

In the implementation being described, each engine 10 has its own fuel management system 1500. In other implementations, a single fuel management system 1500 may manage fuel supply to multiple engines, and may, for example, comprise a duplicate of various of the elements shown in FIG. for the other engine(s).

Fuel is pumped from the fuel tank 50 to the gas turbine engine 10 by a low pressure fuel supply pump 1002. The fuel then flows through a secondary fuel-oil heat exchanger 1004 and a primary fuel-oil heat exchanger 1006 before passing through an engine fuel pump 1003. The engine fuel pump 1003 may be described as a main or high pressure fuel pump. The primary fuel-oil heat exchanger 1006 may be described as a main fuel-oil heat exchanger as the oil flowing therethrough may be used to cool and lubricate the main gearbox 30 of the engine 10. The secondary fuel-oil heat exchanger 1004 may be described as a generator fuel-oil heat exchanger, as the oil flowing therethrough may be used to cool and/or lubricate a generator of the engine 10 configured to provide aircraft electrical power supply (for example, an integrated drive generator (IDG) of the engine 10). The fuel management system 1500 pictured is arranged so that the fuel reaches the secondary fuel-oil heat exchanger 1004 before the primary fuel-oil heat exchanger 1006.

The primary fuel-oil heat exchanger 1006 and the secondary fuel-oil heat exchanger 1004 are configured such that a flow of oil is conveyed through each in addition to the flow of fuel therethrough. The primary fuel-oil heat exchanger 1006 and secondary fuel-oil heat exchanger 1004 are configured such that heat may be transferred between the oil and the fuel flowing therethrough. At cruise conditions, the average temperature of the flow of oil entering the primary fuel-oil heat exchanger 1006 is higher than the average temperature of the fuel entering the primary fuel-oil heat exchanger 1006, and the average temperature of the flow of oil entering the secondary fuel-oil heat exchanger 1004 is higher than the average temperature of the fuel entering the secondary fuel-oil heat exchanger 1004. In this way, the primary fuel-oil heat exchanger 1006 and the secondary fuel-oil heat exchanger 1004 are each configured to transfer thermal energy from a flow of oil to a flow of fuel flowing therethrough at cruise conditions. The fuel system 1000 comprises an electronic controller 1001 configured to control operation of the heat exchangers 1004, 1006.

The primary fuel-oil heat exchanger 1006 may have oil used to lubricate and/or cool a main gearbox 30 of the gas turbine engine 10 passing therethrough, and may therefore be described as a main fuel-oil heat exchanger. The secondary fuel-oil heat exchanger 1004 may have oil used to lubricate and/or cool one or more components of a generator of the engine 10 passing therethrough, and may therefore be described as a generator fuel-oil heat exchanger.

The two flows of oil may be physically separated from one another and optionally also chemically distinct and/or having a different flow rate. Different oil may therefore flow through the primary fuel-oil heat exchanger 1006 from that flowing through the secondary fuel-oil heat exchanger 1004.

In general, at least the majority of the fuel which passes through the secondary fuel-oil heat exchanger 1004 also passes through the main fuel-oil heat exchanger 1006, although either, or each, heat exchanger 1004, 1006 may be provided with a bypass to allow some of the fuel to avoid passing through the respective heat exchanger, for example in the form of a bypass pipe 1005 as shown in FIG. 5. A valve (not shown) may determine what proportion of the fuel passes through the heat exchanger 1004 and what proportion through the bypass pipe 1005.

The two heat exchangers 1004, 1006 may therefore be described as being in series with each other, with respect to fuel flow. In general, at least the majority of the fuel which passes through the secondary fuel-oil heat exchanger 1004 also passes through the main fuel-oil heat exchanger 1006, although each heat exchanger 1004, 1006 may be provided with a bypass to allow some of the fuel to avoid passing through the respective heat exchanger, for example in the form of a bypass pipe 1005. A valve may determine what proportion of the fuel passes through the heat exchanger 1004 and what proportion through the bypass pipe 1005. Additionally or alternatively, one or more bypass pipes may also be provided to allow oil to bypass one or more heat exchangers.

The secondary fuel-oil heat exchanger 1004 and the main fuel-oil heat exchanger 1006 are configured such that a flow of oil is also conveyed through each. The oil flowing through one fuel-oil heat exchanger is different from the oil flowing through the other fuel-oil heat exchanger in the implementation being described, although it will be appreciated that the same oil may flow through one fuel-oil heat exchanger and then through another fuel-oil heat exchanger in other implementations. In such implementations, one or more bypass pipes for oil or fuel may again be provided to allow the fluid(s) to bypass one or more heat exchangers.

The two heat exchangers 1004, 1006 are therefore in separate closed loop systems with respect to oil flow, in the implementation being described, i.e. the oils flowing through the primary and secondary fuel-oil heat exchangers are fluidly separate, and may be chemically distinct from each other.

The fuel system 1000 further comprises a modulator valve 1010 located downstream of the primary fuel-oil heat exchanger 1006 and arranged to divert or direct at least a portion of the fuel which has left the primary fuel-oil heat exchanger back to the fuel tank 50 via a fuel return line 1011. The modulator valve 1010 is configured to modulate a flow of fuel along the fuel return line 1011. The modulator valve 1010 may determine what proportion of the fuel is returned to the fuel tank 50, and what proportion continues to the combustor 16. It will be appreciated the modulator valve 1010 may be located at substantially any suitable position downstream of at least one of the heat exchangers 1004, 1006. For example, the modulator valve 1010 may alternatively be located downstream of the secondary heat exchanger 1004 and upstream of the primary heat exchanger 1006. It will also be appreciated the fuel system 1000 may alternatively comprise only a single fuel-oil heat exchanger or may comprise more than two fuel-oil heat exchangers, and the modulator valve 1010 may be located downstream of at least one of the heat exchangers (either directly downstream or with one or more intervening components of the fuel system 1000 between the modulator valve 1010 and the heat exchanger).

The heat exchangers shown in FIG. 5 and described herein are examples only. The primary and/or secondary heat exchangers may provide cooling for other aircraft systems apart from those described above.

In the illustrated example, the modulator valve 1010 is located downstream of the primary fuel-oil heat exchanger 1006. In the illustrated example, the modulator valve 1010 is positioned upstream of the engine fuel pump 1003, although that is not essential. The modulator valve 1010 is arranged to allow a controlled amount of fuel to be returned to the fuel tank 50.

The fuel system 1000 comprises a plurality of temperature sensors (indicated by the circle symbols surrounding the capitalised letter T) configured to measure a temperature of the fuel at different locations in the fuel system 1000. In the illustrated example, the fuel system 1000 comprises a temperature sensor located in the fuel tank 50 to measure a temperature of fuel in the fuel tank 50. Additionally or alternatively, the fuel system 1000 may comprise a temperature sensor located downstream of the fuel tank 50 and upstream of the heat exchangers 1004, 1006 which may be used to determine or be representative of a temperature of fuel in the fuel tank 50.

In the illustrated example, the fuel system 1000 comprises two temperature sensors located downstream of the heat exchangers 1004, 1006. One of the temperature sensors is located in the fuel return line 1011, whilst the other temperature sensor is located downstream of the modulator valve 1010 and upstream of the combustor 16. Either of both of the temperature sensors may be used to determine or be representative of a temperature of fuel being delivered to the combustor 16 and/or a temperature of fuel being returned to the fuel tank 50. It will be appreciated only one of the temperature sensors located downstream of the heat exchangers 1004, 1006 may be provided. Depending on a position of the modulator valve 1010 relative to one or more heat exchangers (for example the primary heat exchanger 1006 and/or the secondary heat exchanger 1004), it will be appreciated the temperature sensor(s) may be provided at any suitable location downstream of the one or more heat exchangers in order to measure temperature data (or provide temperature data representative of) relating to a temperature of fuel being delivered to the combustor 16 and/or a temperature of fuel being returned to the fuel tank 50.

Returning fuel to the fuel tank 50 provides a mechanism for controlling the fuel flow of the fuel system 1000, for example in order to manage heat loads in the engine 10 and/or to control a temperature of the fuel at different locations in the fuel system 1000 (such as in the fuel tank 50 or on entry to the combustor 16).

The modulator valve 1010 may be arranged to modulate the flow of fuel along the fuel return line 1011 to the fuel tank 50 in any suitable manner. The fuel system 1000 comprises an electronic controller 1001 configured to control operation (for example, opening and closing) of the modulator valve 1010.

In one example, the modulator valve 1010 is arranged to modulate the flow of fuel along the fuel return line 1011 to the fuel tank 50 such that a ratio of a temperature, in Kelvin, of fuel in the fuel tank 50 to a temperature, in Kelvin of fuel being delivered to the combustor 16 at cruise conditions is less than 0.56. The ratio of the temperature of fuel in the fuel tank 50 to the temperature of fuel being delivered to the combustor 16 may also be known or referred to as a $\Delta T$ ratio (or simply as just $\Delta T$). A temperature of the fuel measured downstream of the heat exchangers 1004, 1006 (for example, measured by a temperature sensor located downstream of one or both heat exchangers 1004, 1006) may be used to determine or be representative of a temperature of the fuel being delivered to the combustor 16 (i.e. the fuel temperature on entry to the combustor). A temperature of fuel in the fuel tank 50 may be measured using a temperature sensor located in the fuel tank 50, or a temperature sensor located downstream of the fuel tank 50 and upstream of the heat exchangers 1004, 1006. The electronic controller 1001 of the fuel system 1000 is configured to control operation of the modulator valve 1010 based at least in part on temperature data from at least one of the temperature sensors.

The $\Delta T$ ratio is calculated using the temperature of fuel in the fuel tank 50 in Kelvin (K) and the temperature of fuel being delivered to the combustor 16 in Kelvin (K), wherein 0° C. is equal to 273.15K.

A temperature of fuel in the fuel tank 50 is typically maintained between −54° C. (219.15K) and 65° C. (338.15K). The lower limit of −54° C. is typically used to prevent fuel from freezing in the fuel tank 50. Alternatively, the upper limit for temperature of fuel in the fuel tank 50 may be 55° C. (328.15K), or 5° C. (278.15K), or 0° C. (273.15K). In some other examples, the upper limit for temperature of fuel in the fuel tank 50 may be 100° C. (373.15K).

The maximum temperature of fuel in the fuel tank may be set by fuel flash point to reduce the generation of fuel vapours that can potentially ignite if a source of ignition is present. Where fuel is not being returned to the fuel tank, from the perspective of the engine operation, it may be advantageous for the fuel in the tank to be colder, but not so cold that could cause fuel icing problem in the engine fuel system. If fuel tank temperature is low, it is possible to sink more of the heat generated within the engine back into the fuel which is more efficient. The inventors have identified that when fuel return to tank is being used, the system boundaries extend from just the engine, to the engine and the aircraft fuel tank combined, so a cooler tank it is not necessary more advantageous and the fuel in the tank may be maintained at a hotter temperature.

For sustainable aviation fuel (i.e. a fuel that is 100% SAF or a SAF blend), a temperature of the fuel being delivered to the combustor 16 at cruise conditions is typically at least 120° C. (393.15K), or typically between 120° C. (393.15K) and 180° C. (453.15K) or greater (such as 200° C. or 473.15K). More preferably, the temperature of the fuel being delivered to the combustor 16 at cruise conditions may be typically at least 140° C. (413.15K), or typically between 140° C. (413.15K) and 180° C. (453.15K) or greater (such as 200° C. or 473.15K).

Alternatively, a temperature of the fuel being delivered to the combustor 16 at cruise conditions may be at least 120° C., 125° C., 130° C., 135° C., 140° C., 145° C., 150° C., 155° C., 160° C., 165° C., 170° C., 175° C., 180° C., 185° C., 190° C., 195° C. or 200° C., or a fuel temperature defined between any two of those values.

The temperature of "fuel being delivered to the combustor", the temperature of "fuel being provided to the combustor" and the temperature of "fuel on entry to the combustor" are used interchangeably herein and should be taken to refer to the same temperature.

A temperature of the fuel being delivered to the combustor 16 at cruise conditions may be defined as an average over at least 5 minutes, and optionally over ten minutes, under steady state cruise conditions. These average temperatures do not include transient spikes in temperature, which may be defined as fluctuations in temperature of the fuel during operation, often elevation of the temperature. Each fluctuation may not last more than 5 minutes. The electronic controller 1001 of the fuel system 1000 is configured to control operation of the heat exchangers 1004, 1006 to control a temperature of the fuel being delivered to the combustor 16.

The modulator valve 1010 is arranged to modulate the flow of fuel along the fuel return line 1011 to the fuel tank 50 such that $\Delta T$ is less than 0.56. That value corresponds to less than −54° C./120° C. The inventors have identified that this range can be achieved by using SAF where the temperature of fuel on entry to the combustor is not restricted to 120° C. That may otherwise be the case for a fossil-kerosene fuel due to the risk of thermal breakdown of the fuel. The minimum temperature of the fuel in the fuel tank is limited to −54° C. in this example so as not to risk freezing. The value of $\Delta T$ in this example (and other similar examples in which only an upper bound is given) would be greater than zero.

Generally speaking, heating the fuel to a greater temperature on delivery to the combustor may provide improved engine thermodynamic efficiency. The inventors have determined that the use of SAF may allow a higher fuel temperature on entry to the combustor without risking significant thermal breakdown of the fuel that may otherwise occur if using fossil kerosene fuel. The inventors have determined how the fuel/heat management system of the engine can be advantageously controlled to make use of this difference between SAF and kerosene. Increasing the temperature of the fuel may also be advantageous in allowing more heat to be transferred from the oil within the heat exchanger(s) to improve cooling.

In some examples, the modulator valve 1010 is arranged to modulate the flow of fuel along the fuel return line 1011 to the fuel tank 50 such that $\Delta T$ is less than 0.53. That value corresponds to less than −54° C./140° C. This corresponds to a minimum temperature of the fuel being provided to the combustor being 140° C. and the minimum temperature of fuel in the fuel tank being −54° C. The inventors have determined that operation in this regime may be possible using SAF as it can be advantageous heated to a greater temperature to improve thermodynamic efficiency without such a risk of thermal breakdown.

In some examples, the modulator valve 1010 is arranged to modulate the flow of fuel along the fuel return line 1011 to the fuel tank 50 such that ΔT is in the range of 0.48 to 0.56. That corresponds to between −54° C./180° C. and −54° C./120° C. This corresponds to a temperature of the fuel on entry to the combustor being between 120° C. and 180° C. while the minimum temperature of fuel in the fuel tank remains −54° C. The maximum bound of 180° C. may be advantageous in reducing risk of fuel breakdown that may occur even if SAF is used.

In some examples, the modulator valve 1010 is arranged to modulate the flow of fuel along the fuel return line 1011 to the fuel tank 50 such that ΔT is in the range of 0.48 to 0.53. That corresponds to between −54° C./180° C. and −54° C./140° C. This corresponds to a temperature of the fuel on entry to the combustor being between 140° C. and 180° C. while the minimum temperature of fuel in the fuel tank remains −54° C. This again makes greater use of the thermal properties of SAF to improve thermodynamic efficiency without risk of fuel breakdown at too high a temperature.

In some examples, the modulator valve 1010 is arranged to modulate the flow of fuel along the fuel return line 1011 to the fuel tank 50 such that ΔT is in the range of 0.48 to 1.00. That corresponds to between −54° C./180° C. and 65° C./65° C. The lower bound corresponds to a temperature of fuel on combustor entry being at the maximum bound of 180° C. discussed above while the minimum temperature of fuel in the tank is restricted to −54° C. to reduce the risk of freezing. The maximum bound is 1.00 because the heat exchanger(s) in the present examples is not configured to operate in a condition in which it removes heat from the fuel i.e. the fuel will not be colder at combustor entry compared to its temperature in the fuel tank.

In some examples, the modulator valve 1010 is arranged to modulate the flow of fuel along the fuel return line 1011 to the fuel tank 50 such that ΔT is in the range of 0.48 to 0.90. That corresponds to between −54° C./180° C. and 100° C./140° C. This lower upper bound of 0.90 compared to the example of the previous paragraph corresponds to a maximum temperature of fuel in the fuel tank being 100° C. as discussed above, with the minimum temperature of fuel on combustor entry being 140° C. to make use of the greater thermal properties of SAF.

In some examples, the modulator valve 1010 is arranged to modulate the flow of fuel along the fuel return line 1011 to the fuel tank 50 such that ΔT is in the range of 0.48 to 0.82. That corresponds to between −54° C./180° C. and 65° C./140° C. The upper bound of 0.82 corresponds to a maximum temperature of fuel in the fuel tank being 65° C. as discussed above, with the minimum temperature of fuel on combustor entry being 140° C. to make use of the greater thermal properties of SAF to improve thermodynamic efficiency.

In some examples, the modulator valve 1010 is arranged to modulate the flow of fuel along the fuel return line 1011 to the fuel tank 50 such that ΔT is in the range of 0.56 to 1.00. That corresponds to between −54° C./140° C. and 65° C./65° C. The upper bound of 1.00 corresponds to the maximum that can be achieved without the fuel being hotter at the fuel tank compared to at the combustor. The lower bound corresponds to the fuel having a temperature of 140° C. or greater on entry to the combustor to make use of the thermal properties of SAF to improve thermodynamic efficiency while the minimum temperature at the fuel tank is −54° C. to reduce the risk of freezing.

In some examples, the modulator valve 1010 is arranged to modulate the flow of fuel along the fuel return line 1011 to the fuel tank 50 such that ΔT is in the range of 0.56 to 0.82. That corresponds to between −54° C./140° C. and 65° C./140° C. This corresponds to the same lower bound as the example in the previous paragraph. The upper bound of 0.82 corresponds to a maximum temperature of fuel in the fuel tank being 65° C. as discussed above, with the minimum temperature of fuel on combustor entry being 140° C. to make use of the greater thermal properties of SAF to improve thermodynamic efficiency.

In some examples, the modulator valve 1010 is arranged to modulate the flow of fuel along the fuel return line 1011 to the fuel tank 50 such that ΔT is in the range of 0.56 to 0.75. That corresponds to between −54° C./140° C. and 65° C./180° C. This corresponds to the same lower bound as the example in the previous paragraph. The upper bound of 0.75 corresponds to a maximum temperature of fuel in the fuel tank being 65° C. as discussed above and the maximum 180° C. value of fuel on entry to the combustor as discussed above. The maximum value on entry to the combustor may only be used in some examples when the fuel temperature in the fuel tank is relatively high to avoid a large temperature difference between them.

FIG. 8 shows a method 2000 of operating a gas turbine engine 10. The method 2000 comprises modulating 2001 the flow of fuel along the fuel return line 1011 using the modulator valve 1010 such that a ratio of a temperature of fuel in the fuel tank to a temperature of fuel being delivered to the combustor (ΔT) is as defined in any of the examples described above with respect to the fuel system 1000 or as defined elsewhere herein.

In another example, the modulator valve 1010 is additionally or alternatively arranged to modulate the flow of fuel along the fuel return line 1011 to the fuel tank 50 such that a ratio of ΔT at cruise to ΔT at start-up of the engine 10 is less than 0.56. The electronic controller 1001 of the fuel system 1000 is configured to control operation of the modulator valve 1010 accordingly to achieve this or any other values of ΔT at cruise to ΔT at start-up defined herein.

Operating the modulator valve such that the ratio of ΔT at cruise to ΔT at start-up of the engine is less than 0.56 corresponds to less than a value of ((−54° C./120° C.)/1.00). It therefore corresponds to values that can be reached using fuel temperatures on entry to the combustor of 120° C. or above which can be achieved by making use of the improved thermal properties of SAF compared to fossil fuel. The value of 0.56 corresponds to a minimum value of ΔT being set by the minimum of −54° C. for fuel in the fuel tank to reduce the risk of freezing with the temperature of fuel on entry to the combustor being at least 120° C. The maximum value of ΔT at start-up is 1 which corresponds to the maximum that can be achieved without the fuel being hotter at the fuel tank compared to at the combustor.

In some examples, the modulator valve 1010 is arranged to modulate the flow of fuel along the fuel return line 1011 to the fuel tank 50 such that a ratio of ΔT at cruise to ΔT at start-up of the engine 10 is less than 0.53 (i.e. (−54° C./140° C.)/1.00). This corresponds to the value of the example in the previous paragraph except with a temperature of fuel on entry to the combustor being at least 140° C. to make further use of the thermal properties of SAF to improve thermodynamic efficiency.

In some examples, the modulator valve 1010 is arranged to modulate the flow of fuel along the fuel return line 1011 to the fuel tank 50 such that a ratio of ΔT at cruise to ΔT at start-up of the engine 10 is between 0.48 and 0.56. That corresponds to between ((−54° C./180° C.)/1.00) and ((−54° C./120° C.)/1.00).

The upper bound of 0.56 corresponds to that discussed above. The lower bound of 0.48 corresponds to a maximum temperature of fuel on entry to the combustor being 180° C. as discussed above to reduce the risk of thermal breakdown of the fuel, with the minimum temperature of fuel in the fuel tank being −54° C. to reduce the risk of freezing.

In some examples, the modulator valve 1010 is arranged to modulate the flow of fuel along the fuel return line 1011 to the fuel tank 50 such that a ratio of ΔT at cruise to ΔT at start-up of the engine 10 is between 0.48 and 0.53. That corresponds to between (−54° C./180° C.)/1.00) and (−(54° C./140° C.)/1.00). The upper bound of 0.53 corresponds to that discussed above that makes further use of the thermal properties of SAF. The lower bound of 0.48 corresponds to that discussed in the previous paragraph.

In some examples, the modulator valve 1010 is arranged to modulate the flow of fuel along the fuel return line 1011 to the fuel tank 50 such that a ratio of ΔT at cruise to ΔT at start-up of the engine 10 is between 0.48 and 1.88. That corresponds to between ((−54° C./180° C.)/(100° C./100° C.)) and ((100° C./120° C.)/(−54° C./160° C.)). The inventors have determined that the bounds of the ratio of ΔT at cruise to ΔT at start-up can be determined by the expression: ((min_tank_cruise/max_combustor_cruise)/(max_tank_startup/min_combustor_startup @max tank startup)) to ((max_tank_cruise/min_combustor_cruise)/(min_tank_startup/max_combustor_startup))

The lower bound of 0.48 corresponds to the minimum temperature of fuel in the tank being −54° C. to reduce the risk of freezing with the maximum temperature of fuel on combustor entry at cruise being 180° C. to reduce the risk of thermal break down of the fuel and improving thermodynamic efficiency. The maximum value of ΔT at start-up is 1 because the heat exchanger(s) are not arranged to cool the fuel before it reaches the combustor. The value of ΔT at start-up is therefore limited by the minimum temperature of fuel on entry to the combustor not being less than the corresponding maximum value of fuel in the tank at which the maximum of ΔT is calculated (e.g. 100° C.). The upper bound of 1.88 corresponds to a maximum temperature of fuel in the tank of 100° C., a minimum temperature of fuel on combustor entry of 120° C. in order to make use of the thermal properties of SAF, a minimum temperature of fuel in the tank of −54° C. to reduce the risk of freezing and a maximum temperature of fuel on combustor entry during start up being 160° C.

In some examples, the modulator valve 1010 is arranged to modulate the flow of fuel along the fuel return line 1011 to the fuel tank 50 such that a ratio of ΔT at cruise to ΔT at start-up of the engine 10 is between 0.48 and 1.71. That corresponds to between ((−54° C./180° C.)/(65° C./65° C.)) and ((65° C./120° C.)/(−54° C./160° C.)). These bounds correspond to those of the previous paragraph, but with the maximum temperature of fuel in the fuel tank being 65° C.

In some examples, the modulator valve 1010 is arranged to modulate the flow of fuel along the fuel return line 1011 to the fuel tank 50 such that a ratio of ΔT at cruise to ΔT at start-up of the engine 10 is between 0.48 and 1.70. That corresponds to between ((−54° C./180° C.)/(100° C./100° C.)) and ((100° C./120° C.)/(−54° C./120° C.)). In this example, ΔT at start-up may be ΔT at start-up while the aircraft is on the ground. The bounds in this paragraph correspond to those of the previous paragraph, except with a maximum temperature of fuel in the tank being 100° C. and the maximum temperature of fuel on entry to the combustor during startup being 120° C.

In some examples, the modulator valve 1010 is arranged to modulate the flow of fuel along the fuel return line 1011 to the fuel tank 50 such that a ratio of ΔT at cruise to ΔT at start-up of the engine 10 is between 0.48 and 1.55. That corresponds to between ((−54° C./180° C.)/(65° C./65° C.)) and ((65° C./120° C.)/(−54° C./120° C.)). In this example, ΔT at start-up may be ΔT at start-up while the aircraft is on the ground. These bounds correspond to those of the previous paragraph, except with a maximum temperature of fuel in the tank being 65° C.

In some examples, the modulator valve 1010 is arranged to modulate the flow of fuel along the fuel return line 1011 to the fuel tank 50 such that a ratio of ΔT at cruise to ΔT at start-up of the engine 10 is between 0.48 and 1.88. That corresponds to between ((−54° C./180° C.)/(100° C./100° C.)) and ((100° C./120° C.)/(−54° C./160° C.)). In this example, ΔT at start-up may be ΔT at start-up while the aircraft is in the air. These bounds correspond to those of the previous paragraph, except with a maximum temperature of fuel in the tank being 100° C. and the maximum temperature of fuel on entry to the combustor during startup being 160° C.

In some examples, the modulator valve 1010 is arranged to modulate the flow of fuel along the fuel return line 1011 to the fuel tank 50 such that a ratio of ΔT at cruise to ΔT at start-up of the engine 10 is between 0.48 and 1.71. That corresponds to between ((−54° C./180° C.)/(65° C./65° C.)) and ((65° C./120° C.)/(−54° C./160° C.)). In this example, ΔT at start-up may be ΔT at start-up while the aircraft is in the air. These bounds correspond to those of the previous paragraph, except with a maximum temperature of fuel in the tank being 65° C.

In any example described herein, the fuel temperature on entry to the combustor at cruise may be 120° C. to 180° C. and preferably 140° C. to 180° C. In any example described herein: the fuel temperature on entry to the combustor at startup may be −40° C. to 160° C. The fuel temperature on entry to the combustor at startup on the ground may be −40° C. to 120° C. The fuel temperature on entry to the combustor at startup in the air may be 0° C. to 160° C.

The temperature range in the previous paragraph may correspond to on ground start-up where the engine starts with all components at ambient temperature. For a start-up in the air (i.e. in-flight) the temperature range in the previous paragraph corresponds to a relight scenario. In that case the engine was running and then is being restarted. This may involve descending the aircraft from cruise altitude to a windmill relight envelope. In this time frame the temperature of core components of the engine is dropping but at the point where the relight will happen there may still be some residual heat in the engine. The temperature ranges for restart on the ground and restart in the air are therefore different.

FIG. 9 shows a method 2100 of operating a gas turbine engine 10. The method 2100 comprises modulating 2101 the flow of fuel along the fuel return line 1011 using the modulator valve 1010 such that the ratio of ΔT at cruise to ΔT at start-up of the engine 10 is as defined in any of the examples above or defined elsewhere herein.

In another example, the modulator valve 1010 is additionally or alternatively arranged to initiate return of fuel to the fuel tank 50 when fuel being delivered to the combustor 16 (or having passed through one or both heat exchangers 1004, 1006) is at a temperature of at least 120° C. At fuel temperatures below 120° C. the modulator valve 1010 may prevent return of fuel to the fuel tank 50. The electronic controller 1001 of the fuel system 1000 is configured to control operation of the modulator valve 1010 accordingly. In other examples, the modulator valve may be arranged to initiate return of fuel to the fuel tank 50 when fuel being delivered to the combustor 16 (or having passed through one or both heat exchangers 1004, 1006) is at a temperature of at least 140° C. This may make further use of the thermal properties of SAF. In yet other examples, the modulator valve may be arranged to initiate return of fuel to the fuel tank when fuel having passed through one or both of the heat exchangers is at a temperature of between 120° C. and 180° C., and preferably is at a temperature of between 140° C. and 180° C.

A temperature of the fuel is measured downstream of one or both of the heat exchangers 1004, 1006. In this example, the temperature of the fuel is measured using a temperature sensor in the fuel return line 1011, although it will be appreciated the temperature of the fuel may be measured using a temperature sensor located at substantially any position downstream of one or both heat exchangers 1004, 1006. A temperature of fuel having passed through one or both heat exchangers 1004, 1006 may be used to determine or be representative of a temperature of the fuel being returned to the fuel tank 50. The electronic controller 1001 of the fuel system 1000 is configured to control operation of the modulator valve 1010 based at least in part on temperature data from the temperature sensor(s) located downstream of one or both heat exchangers 1004, 1006.

In this example, the modulator valve 1010 is arranged to initiate return of fuel to the fuel tank 50 when fuel having passed through one or both heat exchangers 1004, 1006 is at a temperature of at least 120° C. (or at least 140° C.; or between 120° C. and 180° C.; or between 140° C. and 180° C.) and an indication of an operating condition is provided, although that is not essential.

The operating condition can be one or more operating conditions including but not limited to a proportion of sustainable aviation fuel SAF in the fuel, a thermal stability of the fuel, a coking level of the fuel, an oxygen content of the fuel and a sulphur content of the fuel.

The operating conditions may be detected on board, for example in-flight, such as using one or more sensors and/or other measurements. The data from the sensor(s) may be provided to the electronic controller 1001 of the fuel system 1000 to control operation of the modulator valve 1010. Alternatively, the operating conditions may be looked up, manually entered or transmitted to the aircraft 1 (for example to the electronic engine controller of the fuel system 1000), either pre-flight or in-flight.

For example, trace substances or species, either present naturally in the fuel or added to act as a tracer, may be used to determine fuel characteristics such as the percentage of sustainable aviation fuel in the fuel or whether the fuel is kerosene. Measurements of the vibrational mode of a piezoelectric crystal exposed to the fuel may be used as the basis for the determination of various fuel characteristics including the aromatic content of the fuel, the oxygen content of the fuel, the thermal stability of the fuel and the coking level of the fuel, for example by measuring the build-up of surface deposits on the piezoelectric crystal which will result in a change in vibrational mode. Other fuel characteristics such as the sulphur content, naphthalene content, aromatic hydrocarbon content and hydrogen to carbon ratio may be determined by measurement of substances present in the exhaust gases emitted by the gas turbine engine 10 during use (e.g., in-flight).

In this example, the modulator valve 1010 is also arranged to modulate the flow of fuel along the fuel return line 1011 based at least in part on a quantity of fuel remaining in the fuel tank, although that is not essential.

The modulator valve 1010 is additionally or alternatively arranged to modulate the flow of fuel along the fuel return line 1011 such that an equilibrium temperature of fuel in the fuel tank 50, following return of fuel to the fuel tank 50, does not exceed a maximum allowable temperature in the fuel tank 50 (for example, 65° C. or 100° C.). The electronic controller 1001 of the fuel system 1000 may determine how long the modulator valve 1010 can stay open and/or how much fuel can be returned to the fuel tank 50 (and optionally in turn modulate the mass flow rate of fuel being returned to the fuel tank 50 using the modulator valve 1010). An example of logic that may be used to cause the modulator valve 1010 to operate in such a manner is provided below:

$$(M_{tank}+M_{FRTT}) \cdot C_p(T_{eq}) \cdot T_{eq} = M_{tank} \cdot C_p(T_{tank}) \cdot T_{tank} + M_{FRTT} \cdot C_p(T_{FRTT}) \cdot T_{FRTT}$$

where $M_{tank}$ is a mass of fuel in the fuel tank 50, $M_{FRTT}$ is a mass of fuel being returned to the fuel tank 50 along the fuel return line 1011, $T_{eq}$ is an equilibrium temperature of mixed fuel in the fuel tank 50 following return of fuel to the fuel tank 50, $T_{tank}$ is a current temperature of fuel in the fuel tank 50 prior to mixing, $T_{FRTT}$ is the temperature of fuel being returned to the fuel tank 50 along the fuel return line 1011, and $C_p$ is a specific heat capacity of the fuel at the respective temperature (for example, $T_{eq}$, $T_{tank}$, $T_{FRTT}$). A mass of fuel to be returned to the fuel tank 50 may be determined based on a desired equilibrium temperature and the current temperatures of fuel in the fuel tank 50 and fuel being returned to the fuel tank 50 along the fuel return line 1011, ensuring the equilibrium temperature does not exceed a pre-determined threshold temperature. Once the mass of fuel to be returned to the fuel tank 50 is determined, the modulator valve 1010 may be operated accordingly to return the required mass of fuel to the fuel tank 50.

A temperature of fuel having passed through one or both heat exchangers 1004, 1006 may be used to determine or be representative of a temperature of the fuel being returned to the fuel tank 50. In this example, the temperature of the fuel being returned to the fuel tank 50 is measured using a temperature sensor in the fuel return line 1011, although it will be appreciated the temperature of the fuel being returned to the fuel tank 50 may be measured using a temperature sensor located at substantially any position downstream of one or both heat exchangers 1004, 1006. A temperature of fuel in the fuel tank 50 may be measured using a temperature sensor located in the fuel tank 50, or a temperature sensor located downstream of the fuel tank 50 and upstream of the heat exchangers 1004, 1006. The electronic controller 1001 of the fuel system 1000 is configured to control operation of the modulator valve 1010 based at least in part on temperature data from at least one of the temperature sensors.

It will be appreciated any suitable alternative logic for controlling operation of the modulator valve 1010 (for example, based at least in part on a quantity of fuel remaining in the fuel tank 50) may be used.

FIG. 10 shows a method 2200 of operating a gas turbine engine 10. The method 2200 comprises initiating 2201 return of fuel to the fuel tank using the modulator valve 1010 when fuel having passed through the heat exchanger(s) is at a temperature of at least 120° C., or within any of the other ranges as described above with respect to the fuel system 1000 or as described elsewhere herein.

In another example, the modulator valve 1010 is additionally or alternatively arranged to modulate the flow of fuel along the fuel return line 1011 such that a ratio of fuel mass returned to the tank 50 to fuel mass delivered to the combustor 16 is between 0 and 9 at cruise conditions. The electronic controller 1001 of the fuel system 1000 is configured to control operation of the modulator valve 1010. The modulator valve 1010 may be arranged to modulate the flow of fuel along the fuel return line 1011 such that the ratio of fuel mass returned to the tank 50 to fuel mass delivered to the combustor 16 is greater than 4 and less than or equal to 9 at cruise conditions, and preferably is greater than 4 and less than or equal to 4.9 at cruise conditions.

SAF typically has a higher calorific value than conventional fuels such as kerosene or kerosene-based fuels. For example, SAF may have a calorific value of between 43.5 MJ/kg and 44 MJ/kg, compared to a typical calorific value of 43.2 MJ/kg for a kerosene-based fuel such as Jet-A. A smaller mass flow rate of SAF is therefore required to provide the same amount of fuel power input to the combustor as that provided using conventional fuels.

In addition, SAF typically has a higher thermal stability than conventional fuels and can therefore be operated at a higher temperature before fuel breakdown (due to thermal degradation) is experienced. SAF is therefore able to absorb more heat than conventional fuels before experiencing fuel breakdown.

Returning fuel to the fuel tank 50 is typically carried out where additional fuel is used for purposes other than combustion, such as to manage heat loads in the engine 10. For example, fuel may be used to cool oil in the engine 10 via the heat exchangers 1004, 1006 and/or to drive one or more actuators for operating other components in the engine 10 or aircraft 1 more generally. Because SAF can absorb more heat than conventional fuels and has a higher calorific value the inventors have determined that a different ratio of fuel mass returned to tank to fuel mass delivered to the combustor may provide improved performance. For example, by using SAF the increased calorific value of the fuel may result in less mass of fuel being combusted, thus allowing a greater percentage of fuel to be returned to the tank compared to using conventional fossil fuels.

FIG. 11 shows a method 2300 of operating a gas turbine engine 10. The method 2300 comprises modulating 2301 flow of fuel along the fuel return line 1011 such that a ratio of fuel mass returned to the tank 50 to fuel mass delivered to the combustor 16 is between 0 and 9 at cruise conditions, as described above with respect to the fuel system 1000. The ratio of fuel mass returned to the tank 50 to fuel mass delivered to the combustor 16 may be in or within any of the other ranges defined above or elsewhere herein.

In another example, the modulator valve 1010 is additionally or alternatively arranged to prevent return of fuel having a temperature of 180° C. or greater to the fuel tank 50. The electronic controller 1001 of the fuel system 1000 is configured to control operation of the modulator valve 1010 accordingly.

A temperature of the fuel is measured downstream of one or both of the heat exchangers 1004, 1006. In this example, the temperature of the fuel is measured using a temperature sensor in the fuel return line 1011, although it will be appreciated the temperature of the fuel may be measured using a temperature sensor located at substantially any position downstream of one or both heat exchangers 1004, 1006. A temperature of fuel having passed through one or both heat exchangers 1004, 1006 may be used to determine or be representative of a temperature of the fuel in the fuel return line 1011. The electronic controller 1001 of the fuel system 1000 is configured to control operation of the modulator valve based at least in part on temperature data from the temperature sensor(s) located downstream of one or both heat exchangers 1004, 1006.

In this example, the modulator valve 1010 is also arranged to prevent return of fuel to the fuel tank when a temperature of fuel in the fuel tank 50 is at a pre-determined upper threshold temperature. As described above, a temperature of fuel in the fuel tank 50 is typically maintained between −54° C. (219.15K) and 100° C. (373.15K). More preferably it may be maintained between −54° C. (219.15K) and 65° C. (338.15K). The upper limit for temperature of fuel in the fuel tank 50 may be any suitable value between the pairs of temperatures in the previous two sentences, for example the upper limit may be 55° C. (328.15K), or 5° C. (278.15K), or 0° C. (273.15K). In some examples, the upper limit of fuel in the fuel tank may be 0° C., 5° C., 10° C., 15° C., 20° C., 25° C., 30° C., 35° C., 40° C., 45° C., 50° C., 55° C., 60° C., 65° C., 70° C., 75° C., 80° C., 85° C., 90° C., 95° C. or 100° C.

By preventing return of fuel to the fuel tank 50 when fuel in the fuel tank 50 is at the pre-determined upper threshold temperature, the threshold temperature will not be exceeded as a result of returning fuel that has passed through one or both heat exchangers 1004, 1006 to the fuel tank 50. A temperature of fuel in the fuel tank 50 may be measured using a temperature sensor located in the fuel tank 50, or a temperature sensor located downstream of the fuel tank 50 and upstream of the heat exchangers 1004, 1006. The electronic controller 1001 of the fuel system 1000 is configured to control operation of the modulator valve 1010 based at least in part on temperature data from at least one of the temperature sensors providing data indicative of a temperature of fuel being returned to the fuel tank 50 and a temperature sensor providing data indicative of a temperature of fuel in the fuel tank 50.

In this example, the modulator valve 1010 is also arranged to modulate the flow of fuel along the fuel return line 1011 based at least in part on a quantity of fuel remaining in the fuel tank, although that is not essential.

The modulator valve 1010 may be arranged to enable fuel to be returned to the fuel tank 50 if a temperature of fuel being returned to the fuel tank 50 is below 180° C. and a temperature of fuel in the fuel tank 50 is below the pre-determined upper threshold temperature. If both of those conditions are satisfied, the modulator valve 1010 is arranged to modulate the flow of fuel along the fuel return line 1011 such that an equilibrium temperature of fuel in the fuel tank 50, following return of fuel to the fuel tank 50, does not exceed the pre-determined upper threshold temperature. The electronic controller 1001 of the fuel system 1000 may determine how long the modulator valve 1010 can stay open and/or how much fuel can be returned to the fuel tank 50 (and optionally in turn modulate the mass flow rate of fuel being returned to the fuel tank 50 using the modulator valve 1010). An example of logic that may be used to cause the modulator valve 1010 to operate in such a manner is provided below:

$$(M_{tank} + M_{FRTT}) \cdot C_p(T_{eq}) \cdot T_{eq} = M_{tank} \cdot C_p(T_{tank}) \cdot T_{tank} + M_{FRTT} \cdot C_p(T_{FRTT}) \cdot T_{FRTT}$$

where $M_{tank}$ is a mass of fuel in the fuel tank 50, $M_{FRTT}$ is a mass of fuel being returned to the fuel tank 50 along the fuel return line 1011, $T_{eq}$ is an equilibrium temperature of mixed fuel in the fuel tank 50 following return of fuel to the fuel tank 50, $T_{tank}$ is a current temperature of fuel in the fuel tank 50 prior to mixing, $T_{FRTT}$ is a current temperature of fuel being returned to the fuel tank 50 along the fuel return line 1011, $C_p$ is a specific heat capacity of the fuel at the respective temperature (for example, $T_{eq}$, $T_{tank}$, $T_{FRTT}$). A mass of fuel to be returned to the fuel tank 50 may be determined based on a desired equilibrium temperature and the current temperatures of fuel in the fuel tank 50 and fuel being returned to the fuel tank 50 along the fuel return line 1011, ensuring the equilibrium temperature does not exceed the pre-determined upper threshold temperature for fuel in the fuel tank 50. Once the mass of fuel to be returned to the fuel tank 50 is determined, the modulator valve 1010 may be operated accordingly to return the required mass of fuel to the fuel tank 50.

A temperature of fuel having passed through one or both heat exchangers 1004, 1006 may be used to determine or be representative of a temperature of the fuel being returned to the fuel tank 50. In this example, the temperature of the fuel being returned to the fuel tank 50 is measured using a temperature sensor in the fuel return line 1011, although it will be appreciated the temperature of the fuel being returned to the fuel tank 50 may be measured using a temperature sensor located at substantially any position downstream of one or both heat exchangers 1004, 1006. A temperature of fuel in the fuel tank 50 may be measured using a temperature sensor located in the fuel tank 50, or a temperature sensor located downstream of the fuel tank 50 and upstream of the heat exchangers 1004, 1006. The electronic controller 1001 of the fuel system 1000 is configured to control operation of the modulator valve 1010 based at least in part on temperature data from at least one of the temperature sensors.

It will be appreciated any suitable alternative logic for controlling operation of the modulator valve 1010 (for example, based at least in part on a quantity of fuel remaining in the fuel tank 50) may be used.

FIG. 12 shows a method 2400 of operating a gas turbine engine 10. The method 2400 comprises preventing 2401 return of fuel having a temperature of 180° C. or greater to the fuel tank 50 using the modulator valve 1010, as described above with respect to the fuel system 1000. The method 2400 may comprise preventing 2401 return of fuel having a temperature within any of the ranges defined above or elsewhere herein to the fuel tank 50 using the modulator valve 1010. The method may comprise preventing return of fuel if it would exceed the upper limit of the tank temperature defined above or as defined elsewhere herein.

The fuel system 1500 may be configured to carry out any one or more of methods 2000, 2100, 2200, 2300, 2400. It may also carry out the method of FIG. 13 described below if it is equipped with a suitable fuel recirculation line.

Figure 6:
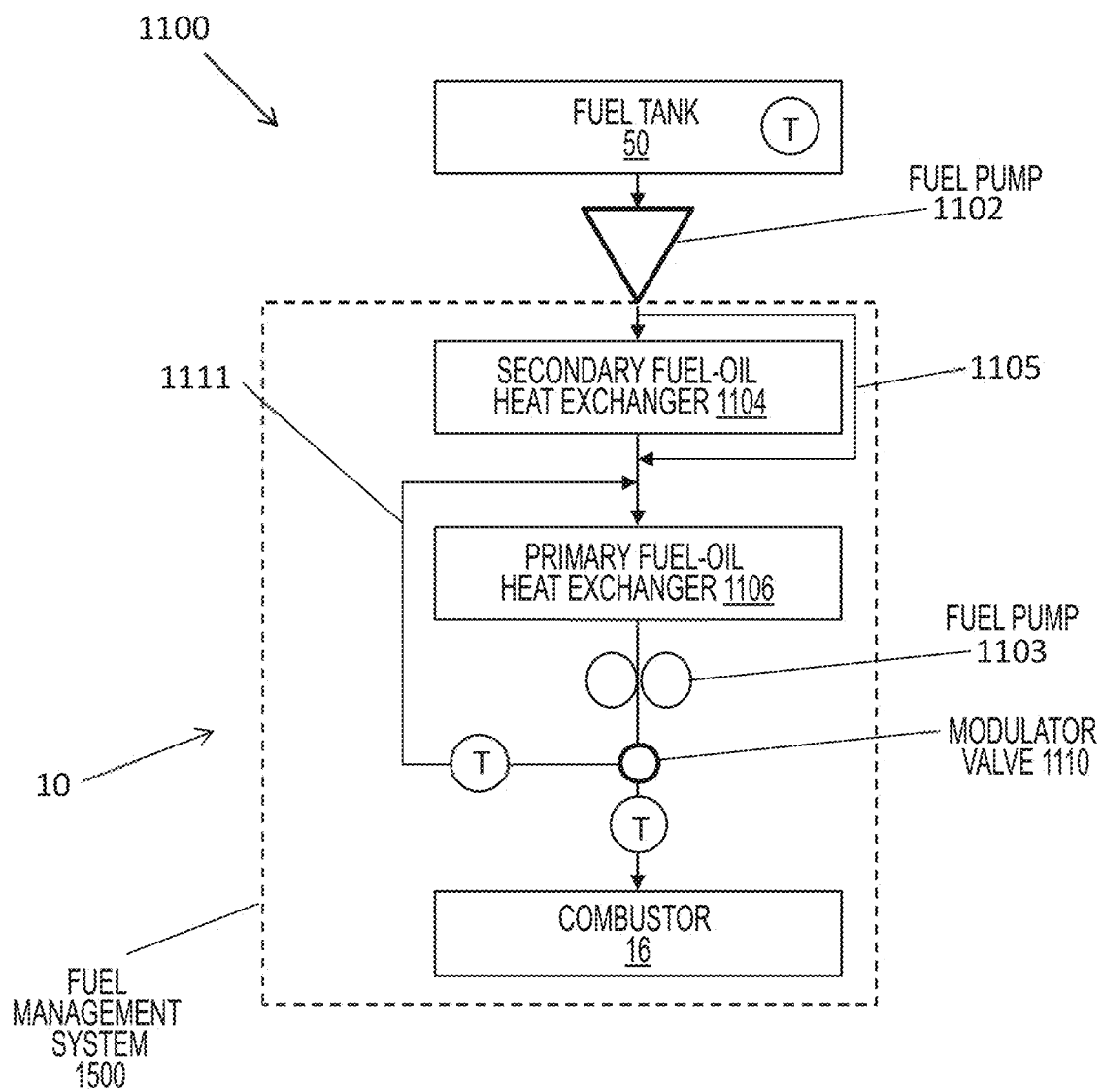
FIG. 6 is a schematic representation of an example fuel system comprising a fuel recirculation line.

Another example fuel system 1100 comprising a fuel flow path from the fuel tank 50 to other components of the fuel system 1100 is shown schematically in FIG. 6. The fuel system 1100 is substantially similar to the fuel system 1000 described above with respect to FIG. 5, with like reference numerals indicating like elements.

The fuel system 1100 comprises a fuel recirculation line 1111. The fuel recirculation line 1111 is arranged to recirculate fuel from a first point on the fuel flow path to a second point on the fuel flow path. In this example, the fuel flow path may be referred to as a main fuel flow path as it extends from the fuel tank to the combustor. The second point on the fuel flow path is upstream of the first point. The first point corresponds to an inlet of the fuel recirculation line 1111. The second point corresponds to an outlet of the fuel recirculation line 1111. The fuel system 1100 comprises a modulator valve 1110 arranged to modulate a flow of fuel along the fuel recirculation line 1111, between the inlet and outlet of the fuel recirculation line 1111. The fuel system 1100 comprises a temperature sensor located in the fuel recirculation line 1111, although that is not essential. The fuel system 1100 may also comprise a fuel return line (not shown for clarity) as described above with respect to the fuel system 1000 shown in FIG. 5, although that is not essential.

In the example shown, the first point or inlet of the fuel recirculation line 1111 is located downstream of the primary fuel-oil heat exchanger 1106 on the fuel flow path. The first point is located downstream of the fuel pump 1103. The modulator valve 1110 is also located on the fuel flow path, although it will be appreciated the modulator valve 1110 may instead be located along the fuel recirculation line 1111. The second point or outlet of the fuel recirculation line 1111 is located upstream of the primary fuel-oil heat exchanger 1106.

The inlet and outlet of the fuel recirculation line 1111 may alternatively be located at any suitable position on the fuel flow path. For example, the inlet of the fuel recirculation line 1111 may be located upstream of the fuel pump 1003, or downstream of the secondary fuel-oil heat exchanger 1104, or downstream of the fuel pump 1102. The outlet of the fuel recirculation line 1111 may be located upstream of the fuel pump 1103, or upstream of the secondary fuel-oil heat exchanger 1104, or upstream of the fuel pump 1102. Where the outlet of the fuel recirculation line 1111 is located upstream of the fuel pump 1102 the inlet of the recirculation line may be upstream of the pump 1103. It will also be appreciated the fuel system 1100 may alternatively comprise only a single fuel-oil heat exchanger or may comprise more than two fuel-oil heat exchangers, and the first point or second point of the fuel recirculation line 1111 may be located at any suitable position (upstream or downstream, either directly or indirectly with one or more intervening components on the main fuel flow path) respective to the one or more heat exchangers. A fuel recirculation line 1111 may be provided for any given fuel-oil heat exchanger.

The fuel recirculation line 1111 is arranged to allow some fuel to flow along at least a portion of the fuel flow path a plurality of times (that is, to recirculate some of the fuel along at least a portion of the fuel flow path). In the example shown, the modulator valve 1110 is arranged to modulate flow of fuel along the fuel recirculation line 1111 such that an amount of fuel passes through the primary fuel-oil heat exchanger 1106 a plurality of times before being delivered to the combustor 16. That may allow additional heat to be transferred into the same fuel and increase a temperature of the fuel before the fuel is delivered to the combustor 16. A temperature of the fuel may be increased to at least 120° C. before the fuel is delivered to the combustor 16. Recirculating the fuel through the fuel recirculation line 1111 using the modulator valve 1110 may therefore allow hotter fuel to be delivered to the combustor 16, which may increase efficiency of the engine 10. In addition, a quantity (for example, a mass) of fuel used to manage heat loads in the engine 10 (for example, via the heat exchangers 1104, 1106) may be reduced, which may in turn reduce (or eliminate, depending on operating conditions) a quantity of fuel required to be returned to the fuel tank 50 when managing heat loads in the engine 10. Reducing or eliminating a quantity of fuel returned to the fuel tank 50 may also enable fuel in the fuel tank 50 to be colder before entering the fuel flow path, which may improve cooling of oil in the fuel-oil heat exchangers 1104, 1106.

The modulator valve 1110 and/or inlet of the fuel recirculation pipe 1111 may be located downstream of the fuel pump 1103, such that recirculated fuel passes through both the primary fuel-oil heat exchanger 1106 and the fuel pump 1103 multiple times rather than only through the primary heat exchanger 1106. Recirculating fuel through the fuel pump 1103 may allow for more adjustable control of fuel flow rate to the combustor 16 for a given shaft speed of the engine 10, noting that pump speed (or a limited group of pump speed options) is often set by shaft speed (for example, pump speed may be proportionally related to shaft speed). For example, if a required fuel flow rate to maintain a current aircraft thrust is lower than the pump speed for the required shaft speed, a larger proportion of fuel may be recirculated through the pump such that the flow rate through the pump is higher than the flow rate to the combustor 16. A lower flow rate of fuel to the combustor 16 may also be provided for a higher calorific value fuel, without changing pump speed, by instead increasing the amount of recirculation. Typically there is no fuel wasted, as fuel is always recirculated and always burnt in the combustor.

In the example shown, the modulator valve 1110 is arranged to actively control a quantity of fuel recirculated along the fuel recirculation line 1111. The electronic controller 1001 of the fuel system 1000 is configured to control operation of the modulator valve 1110. The active control may be performed based on one or more parameters such as:
 core shaft speed and engine thrust demand:
 current fuel temperature at one or more locations, for example along the fuel flow path (such as downstream of one or more heat exchangers) and/or along the fuel recirculation line;
 fuel calorific value;
 fan rotational speed;
 fuel flow rate to the combustor (commonly referred to as WFE, weight of main engine fuel flow);
 fuel viscosity; and
 main or engine fuel pump speed, or speed options.

Additionally or alternatively, a speed of the fuel pump 1103 may be adjusted, either speeding up fuel flow rate (and so reducing heat transfer per unit volume of fuel passing through the heat exchangers 1104, 1106) or reducing fuel flow rate (and so increasing heat transfer per unit volume of fuel passing through the heat exchangers 1104, 1106).

Alternatively, the control of the quantity of fuel recirculated along the fuel recirculation line 1111 using the modulator valve 1110 may not be active. Rather, a set or fixed proportion of fuel in the main fuel flow path may be recirculated along the fuel recirculation line 1111 via the modulator valve 1110, for example the ratio of fuel mass recirculated to fuel mass delivered to the combustor may be between 0 and 9. More preferably, the ratio of fuel mass recirculated to fuel mass delivered to the combustor may be greater than 4 and less than or equal to 9 at cruise conditions, and even more preferably greater than 4 and less than or equal to 4.9 at cruise conditions. It may therefore be the same as the fuel ratio returned to the tank as defined above, such that anything described herein that applies to fuel being returned to the tank may also apply to the present example in which fuel is instead recirculated along the fuel recirculation line 1111.

In some examples, the fuel recirculation line 1111 is arranged to supply fuel to one or more additional aircraft and/or engine mechanisms (not shown) before re-joining the fuel flow path. The one or more additional aircraft mechanisms may therefore be located on the fuel recirculation line 1111. The additional aircraft mechanisms may comprise a nacelle anti-icing system, actuators, a turbine case cooling system or any other suitable aircraft mechanism.

FIG. 13 shows a method 2500 of operating a gas turbine engine 10. The method 2500 comprises modulating 2501 the flow of fuel along the fuel recirculation line 1111, as described above with respect to the fuel system 1100.

Figure 7:
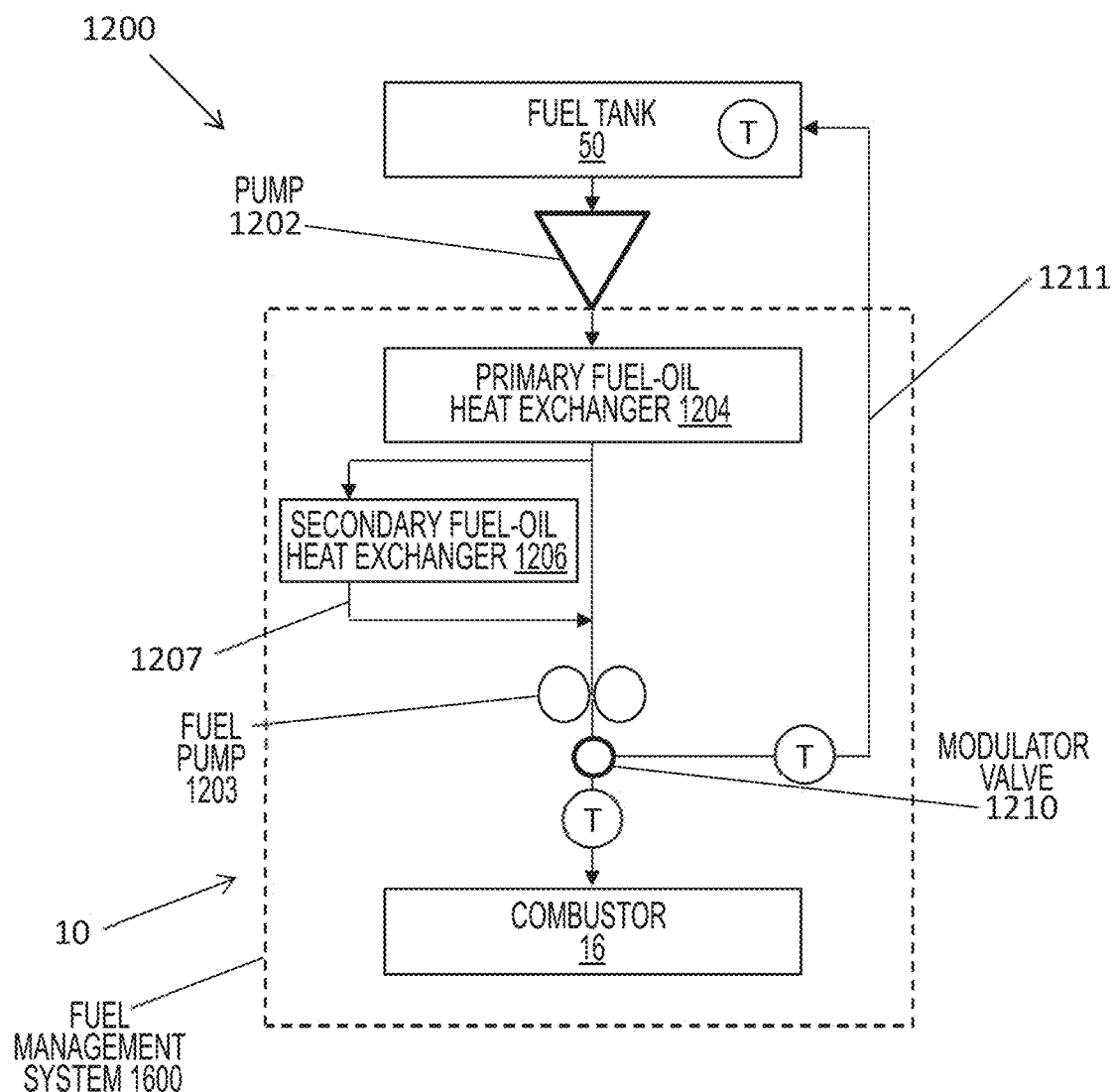
FIG. 7 is a schematic representation of another example fuel system comprising a fuel return line.

Another example fuel system 1200 comprising a fuel flow path from the fuel tank 50 to other components of the fuel system 1200 is shown schematically in FIG. 7. In the example shown, the engine 10 is a direct drive engine as shown in FIG. 4. The fuel system 1200 of FIG. 7 may however be used with other engine architectures, such as a geared architecture. Fuel system 1200 comprises both the fuel supply system (comprising the fuel tank 50 and pump 1202) which supplies fuel to the engine 10 and the fuel management system 1600 (which operates within the engine 10) of the aircraft 1. In the implementation being described, each engine 10 has its own fuel management system 1600. In other implementations, a single fuel management system 1600 may manage fuel supply to multiple engines, and may, for example, comprise a duplicate of various of the elements shown in FIG. 6 for the other engine(s).

Fuel is pumped from the fuel tank 50 to the gas turbine engine 10 by a low pressure fuel supply pump 1202. The fuel then flows through a primary fuel-oil heat exchanger 1204 before flowing through an engine fuel pump 1203. The engine fuel pump 1203 may be described as a main or high pressure fuel pump. At least a portion of the fuel then flows through a secondary fuel-oil heat exchanger 1206 via a line 1207 branching off the main fuel flow path (between the fuel tank 50 and the combustor 16), and at least a portion of the fuel flows towards the combustor 16 without flowing through the secondary fuel-oil heat exchanger 1206. The primary fuel-oil heat exchanger 1204 may be described as a main fuel-oil heat exchanger. The secondary fuel-oil heat exchanger 1206 may be described as a servo fuel-oil heat exchanger. The fuel management system 1600 is arranged so that the fuel reaches the primary fuel-oil heat exchanger 1204 before the secondary fuel-oil heat exchanger 1206.

In the example shown in FIG. 7, from the secondary fuel-oil heat exchanger 1206 the portion of fuel that flowed therethrough then flows to the combustor 16 of the gas turbine engine 10, re-joining fuel which flowed through the primary fuel-oil heat exchanger 1204 only.

The primary fuel-oil heat exchanger 1204 and the secondary fuel-oil heat exchanger 1206 are configured such that a flow of oil is also conveyed therethrough. The primary fuel-oil heat exchanger 1204 and secondary fuel-oil heat exchanger 1206 are configured such that heat may be transferred between the oil and the fuel flowing therethrough. At cruise conditions, the average temperature of the flow of oil entering the primary fuel-oil heat exchanger 1204 and the secondary fuel-oil heat exchanger 1206 is higher than the average temperature of the fuel entering the primary fuel-oil heat exchanger 1204 and the secondary fuel-oil heat exchanger 1206 respectively. In this way, the primary fuel-oil heat exchanger 1204 and the secondary fuel-oil heat exchanger 1206 are configured to transfer thermal energy from a flow of oil to a flow of fuel flowing therethrough at cruise conditions. The fuel system 1200 comprises an electronic controller 1001 configured to control operation of the heat exchangers 1204, 1206.

In various arrangements of the fuel management system 1600, the oil flows through the secondary fuel-oil heat exchanger 1206 prior to flowing through the primary fuel-oil heat exchanger 1204, and does not flow through any engine components which would increase its temperature therebetween. The oil is therefore hotter on entry to the secondary fuel-oil heat exchanger 1206 than on entry to the primary fuel-oil heat exchanger 1204. By contrast, the fuel flows through the primary fuel-oil heat exchanger 1204 prior to flowing through the secondary fuel-oil heat exchanger 1206. In this arrangement, the fuel temperature exiting the secondary fuel-oil heat exchanger 1206 is higher than the fuel temperature exiting the primary fuel-oil heat exchanger 1204. The engine fuel pump 1203 may alternatively be placed upstream of the secondary fuel-oil heat exchanger 1206 (or upstream of where the line 1207 re-joins the main fuel flow path), meaning it is not exposed to these further elevated fuel temperatures.

The fuel management system 1600 may be provided with a bypass to allow some of the fuel to avoid passing through the respective heat exchanger, for example in the form of a bypass pipe with an inlet located upstream of the primary fuel-oil heat exchanger 1204 and an outlet located downstream of the primary fuel-oil heat exchanger 1204 and upstream of the secondary fuel-oil heat exchanger 1206, as described above with respect to FIG. 5. A valve may determine what proportion of the fuel passes through the heat exchanger 1204 and what proportion through the bypass pipe.

The fuel system 1200 further comprises a modulator valve 1210 located downstream of the primary fuel-oil heat exchanger 1204 and arranged to divert or direct at least a portion of the fuel which has left the primary fuel-oil heat exchanger 1204 back to the fuel tank 50 via a fuel return line 1211. The modulator valve 1210 is configured to modulate a flow of fuel along the fuel return line 1211. The modulator valve 1210 may determine what proportion of the fuel is returned to the fuel tank 50, and what proportion continues to the combustor 16. It will be appreciated the modulator valve 1210 may be located at substantially any suitable position downstream of at least one of the heat exchangers 1204, 1206. For example, the modulator valve 1210 may alternatively be located upstream of the secondary heat exchanger 1206 (for example, upstream of where the line 1207 re-joins the main fuel flow path). It will also be appreciated the fuel system 1200 may alternatively comprise only a single fuel-oil heat exchanger or may comprise more than two fuel-oil heat exchangers, and the modulator valve 1210 may be located downstream of at least one of the heat exchangers (either directly downstream or with one or more intervening components of the fuel system 1200 between the modulator valve 1210 and the heat exchanger). The primary and secondary heat exchangers described above are one example only, and may provide cooling to any suitable engine systems or components.

In the illustrated example, the modulator valve 1210 is located downstream of the primary fuel-oil heat exchanger 1204, the main fuel pump 1203, the inlet of the line 1207 leading to the secondary fuel-oil heat exchanger 1206, and the outlet of the line 1207 re-joining the main fuel flow path from the secondary fuel-oil heat exchanger 1206. It will be appreciated the modulator valve 1210 may alternatively be located upstream of the fuel pump 1203.

The fuel system 1200 comprises a plurality of temperature sensors (indicated by the circle symbols surrounding the capitalised letter T) configured to measure a temperature of the fuel at different locations in the fuel system 1200. In the illustrated example, the fuel system 1200 comprises a temperature sensor located in the fuel tank 50 to measure a temperature of fuel in the fuel tank 50. Additionally or alternatively, the fuel system 1200 may comprise a temperature sensor located downstream of the fuel tank 50 and upstream of the heat exchangers 1204, 1206 which may be used to determine or be representative of a temperature of fuel in the fuel tank 50.

In the illustrated example, the fuel system 1200 comprises two temperature sensors located downstream of the heat exchangers 1204, 1206. One of the temperature sensors is located in the fuel return line 1211, whilst the other temperature sensor is located downstream of the modulator valve 1210 and upstream of the combustor 16. Either or both of the temperature sensors may be used to determine or be representative of a temperature of fuel being delivered to the combustor 16 and/or a temperature of fuel being returned to the fuel tank 50. It will be appreciated only one of the temperature sensors located downstream of the heat exchangers 1204, 1206 may be provided. Depending on a position of the modulator valve 1210 relative to one or more heat exchangers (for example the primary heat exchanger 1204 and/or the secondary heat exchanger 1206), it will be appreciated the temperature sensor(s) may be provided at any suitable location downstream of the one or more heat exchangers in order to measure temperature data relating to (or provide temperature data representative of) a temperature of fuel being delivered to the combustor 16 and/or a temperature of fuel being returned to the fuel tank 50.

Returning fuel to the fuel tank 50 provides a mechanism for controlling the fuel flow of the fuel system 1200, for example in order to manage heat loads in the engine 10 and/or to control a temperature of the fuel at different locations in the fuel system 1200 (such as in the fuel tank 50 or on entry to the combustor 16).

The modulator valve 1210 may be arranged to modulate the flow of fuel along the fuel return line 1211 to the fuel tank 50 in any suitable manner, for example as described above with respect to the fuel system 1000 shown in FIG. 5. The fuel system 1200 comprises an electronic controller 1001 configured to control operation (for example, opening and closing) of the modulator valve 1210. It will also be appreciated any one or more of the methods 2000, 2100, 2200, 2300, 2400 shown in FIGS. 8 to 12 and described above with respect to the fuel system 1000 may equally be carried out using the fuel system 1200 shown in FIG. 7. The fuel system 1200 may also carry out the method 2500 of FIG. 13 if it is equipped with a suitable fuel recirculation line as described below.

Figure 14:
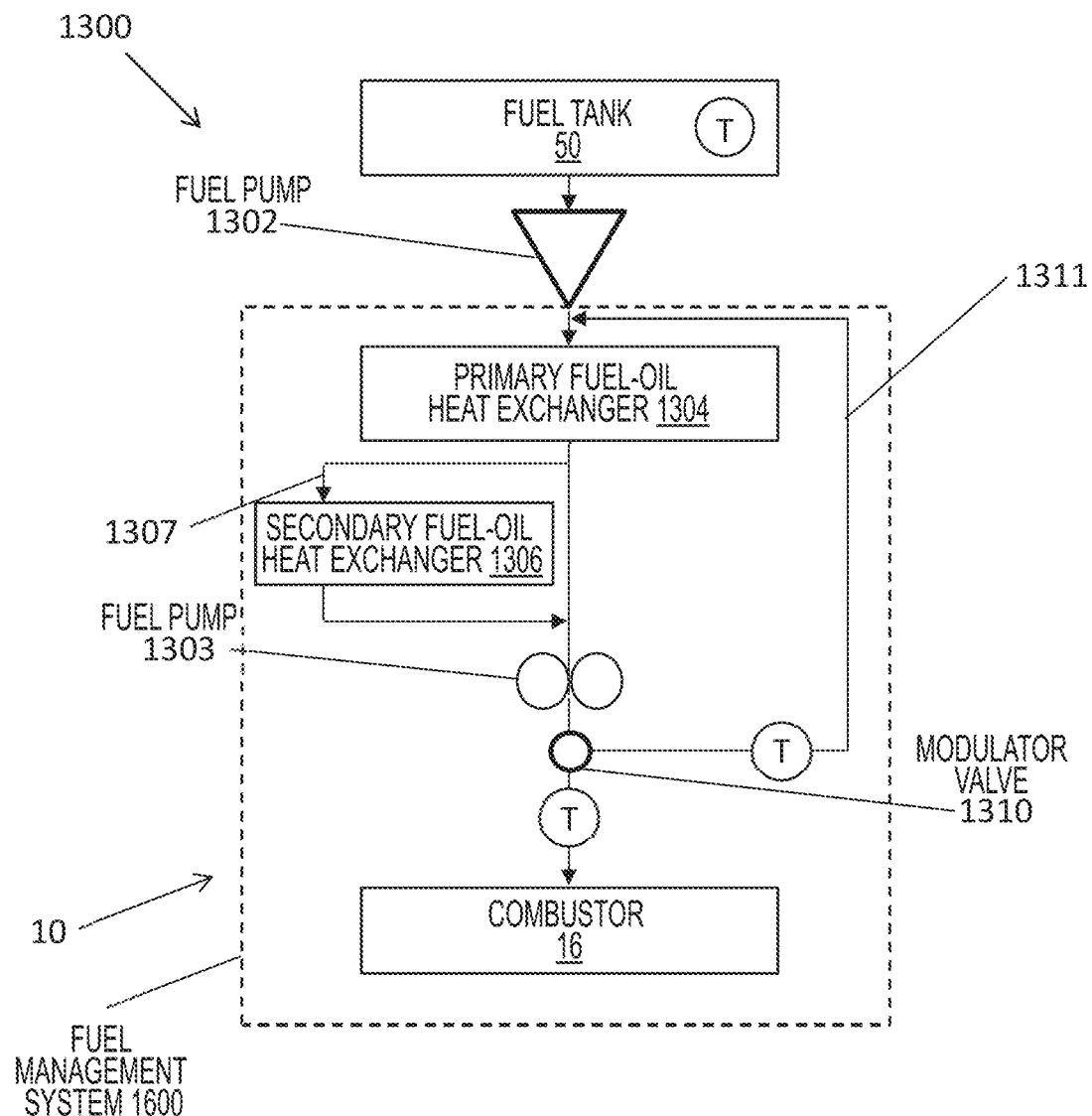
FIG. 14 is a schematic representation of an example fuel system comprising a fuel recirculation line.

Another example fuel system 1300 comprising a fuel flow path from the fuel tank 50 to other components of the fuel system 1300 is shown schematically in FIG. 14. The fuel system 1300 is substantially similar to the fuel system 1200 described above with respect to FIG. 7, with like reference numerals indicating like elements.

The fuel system 1300 comprises a fuel recirculation line 1311. The fuel recirculation line 1311 is arranged to recirculate fuel from a first point on the fuel flow path to a second point on the fuel flow path. In this example, the fuel flow path is a main fuel flow path extending from the fuel tank to the combustor. The second point on the fuel flow path is upstream of the first point. The first point corresponds to an inlet of the fuel recirculation line 1311. The second point corresponds to an outlet of the fuel recirculation line. The fuel system 1300 comprises a modulator valve 1310 arranged to modulate a flow of fuel along the fuel recirculation line 1311, between the inlet and outlet of the fuel recirculation line 1311. The fuel system 1300 comprises a temperature sensor located in the fuel recirculation line 1311, although that is not essential. The fuel system 1300 may also comprise a fuel return line (not shown for clarity) as described above with respect to the fuel system 1200 shown in FIG. 7, although that is not essential.

In the example shown, the first point or inlet of the fuel recirculation line 1311 is located downstream of the primary fuel-oil heat exchanger 1304 on the fuel flow path. The first point is located downstream of the fuel pump 1303. The first point is located downstream of the inlet of the line 1307 leading to the secondary fuel-oil heat exchanger 1306, and downstream of the outlet of the line 1307 re-joining the main fuel flow path from the secondary fuel-oil heat exchanger 1306 (between the fuel tank 50 and the combustor 16). The first point is therefore downstream of the flow paths to and from the secondary heat exchanger 1306. The second point is upstream of the flow paths to and from the secondary heat exchanger. The modulator valve 1310 is also located on the main fuel flow path, although it will be appreciated the modulator valve 1310 may instead be located at another position on the fuel flow path or located along the fuel recirculation line 1311. The second point or outlet of the fuel recirculation line 1311 is located upstream of the primary fuel-oil heat exchanger 1304.

The inlet and outlet of the fuel recirculation line 1311 may alternatively be located at any suitable position on the fuel flow path. For example, the inlet of the fuel recirculation line 1311 may be located downstream of the primary heat exchanger 1304 but upstream of the fuel pump 1303, or downstream of the primary heat exchanger 1304 and the fuel pump 1303 but upstream of the inlet of the line 1307 leading to the secondary heat exchanger 1306, or downstream of the outlet of the line 1307 re-joining the main fuel flow path from the secondary heat exchanger 1306. The outlet of the fuel recirculation line 1311 may be located upstream of the inlet of the line 1307 leading to the secondary heat exchanger 1306, or upstream of the fuel pump 1303, or upstream of the fuel pump 1302. It will also be appreciated the fuel system 1300 may alternatively comprise only a single fuel-oil heat exchanger or may comprise more than two fuel-oil heat exchangers, and the first point or second point of the fuel recirculation line 1311 may be located at any suitable position (upstream or downstream, either directly or indirectly with one or more intervening components on the fuel flow path) respective to the one or more heat exchangers. A fuel recirculation line 1311 may be provided for any given fuel-oil heat exchanger.

The fuel recirculation line 1311 is arranged to allow some fuel to flow along at least a portion of the fuel flow path a plurality of times (that is, to recirculate some of the fuel along at least a portion of the fuel flow path) before being delivered to the combustor 16. In the example shown, the modulator valve 1310 is arranged to modulate flow of fuel along the fuel recirculation line 1311 such that an amount of fuel passes through the primary fuel-oil heat exchanger 1304 a plurality of times before being delivered to the combustor 16. That may allow additional heat to be transferred into the same fuel and increase a temperature of the fuel before the fuel is delivered to the combustor 16. A temperature of the fuel may be increased to at least 120° C. before the fuel is delivered to the combustor 16. In some examples, temperature of the fuel may be increased to at least 140° C. before the fuel is delivered to the combustor 16, or to within the range of between 120° C. and 180° C. or between 140° C. and 180° C. Recirculating the fuel through the fuel recirculation line 1311 using the modulator valve 1310 may therefore allow hotter fuel to be delivered to the combustor 16, which may increase efficiency of the engine 10. In addition, a quantity (for example, a mass) of fuel used to manage heat loads in the engine 10 (for example, via the heat exchangers 1304, 1306) may be reduced, which may in turn reduce (or eliminate, depending on operating conditions) a quantity of fuel required to be returned to the fuel tank 50 when managing heat loads in the engine 10. Reducing or eliminating a quantity of fuel returned to the fuel tank 50 may also enable fuel in the fuel tank 50 to be colder before entering the fuel flow path, which may improve cooling of oil in the fuel-oil heat exchangers 1304, 1306.

In the example shown, the modulator valve 1310 and/or inlet of the fuel recirculation pipe 1311 is also located downstream of the fuel pump 1303, such that recirculated fuel passes through both the primary fuel-oil heat exchanger 1304 and the fuel pump 1303 multiple times. Recirculating fuel through the fuel pump 1303 may allow for more adjustable control of fuel flow rate to the combustor 16 for a given shaft speed of the engine 10, noting that pump speed (or a limited group of pump speed options) is often set by shaft speed (for example, pump speed may be proportionally related to shaft speed). For example, if a required fuel flow rate to maintain a current aircraft thrust is lower than the pump speed for the required shaft speed, a larger proportion of fuel may be recirculated through the pump such that the flow rate through the pump is higher than the flow rate to the combustor 16. A lower flow rate of fuel to the combustor 16 may also be provided for a higher calorific value fuel, without changing pump speed, by instead increasing the amount of recirculation.

The modulator valve 1310 may be arranged to modulate the flow of fuel along the fuel recirculation line 1311 in any suitable manner, for example as described above with respect to the fuel system 1200 shown in FIG. 7. The fuel system 1300 comprises an electronic controller 1001 configured to control operation (for example, opening and closing) of the modulator valve 1310. It will also be appreciated the method 2500 shown in FIG. 13 and described above with respect to the fuel system 1100 may equally be carried out using the fuel system 1300 shown in FIG. 14.

In some examples, the fuel recirculation line 1311 is arranged to supply fuel to one or more additional engine and/or aircraft mechanisms (not shown) before re-joining the fuel flow path. The one or more additional aircraft mechanisms may therefore be located on the fuel recirculation line 1311. The additional aircraft mechanisms may comprise a nacelle anti-icing system, actuators, a turbine case cooling system or any other suitable aircraft mechanism.

Figure 15:
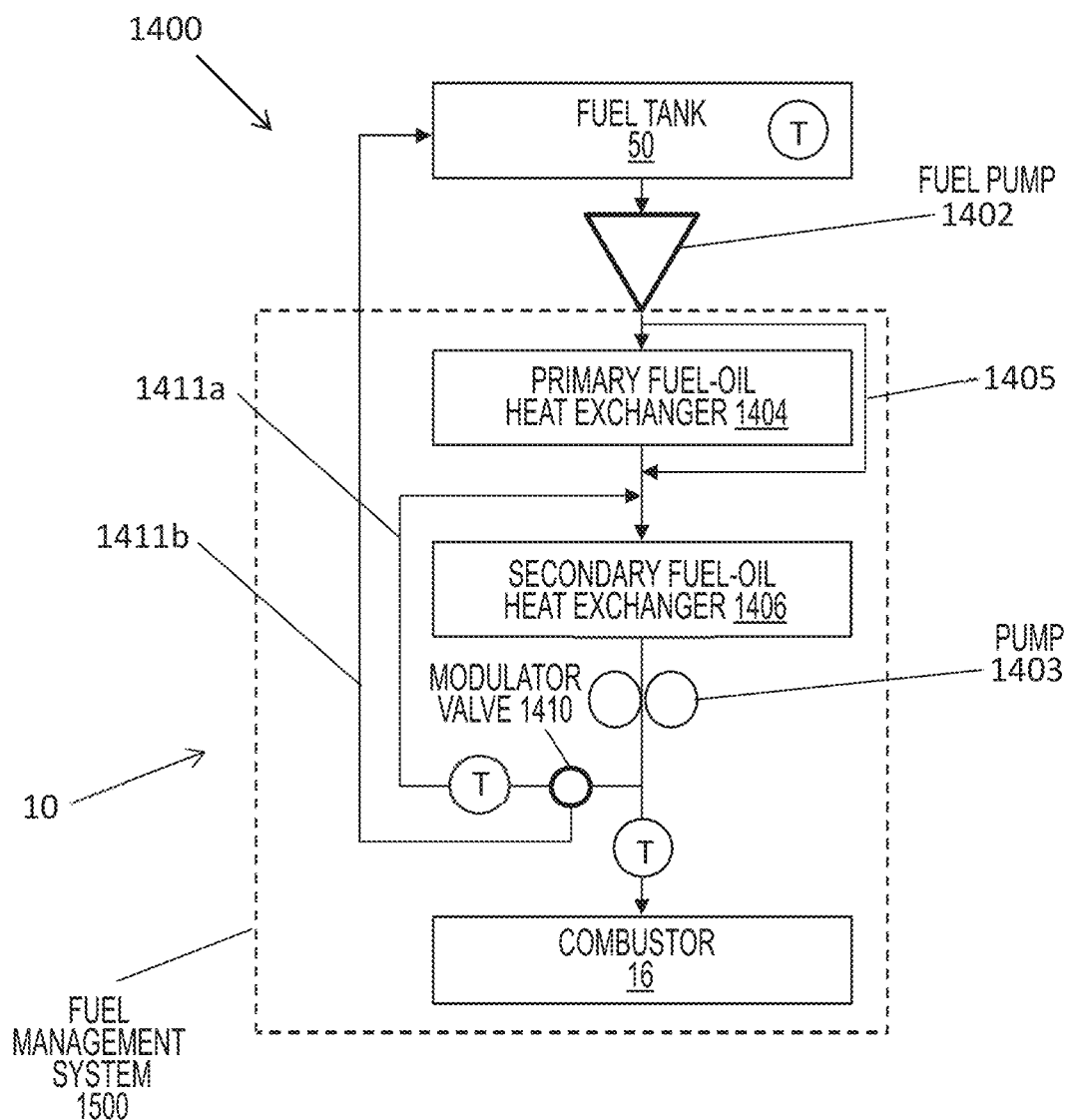
FIG. 15 is a schematic representation of an example fuel system comprising a fuel recirculation line and a fuel return line.
Figure 16:
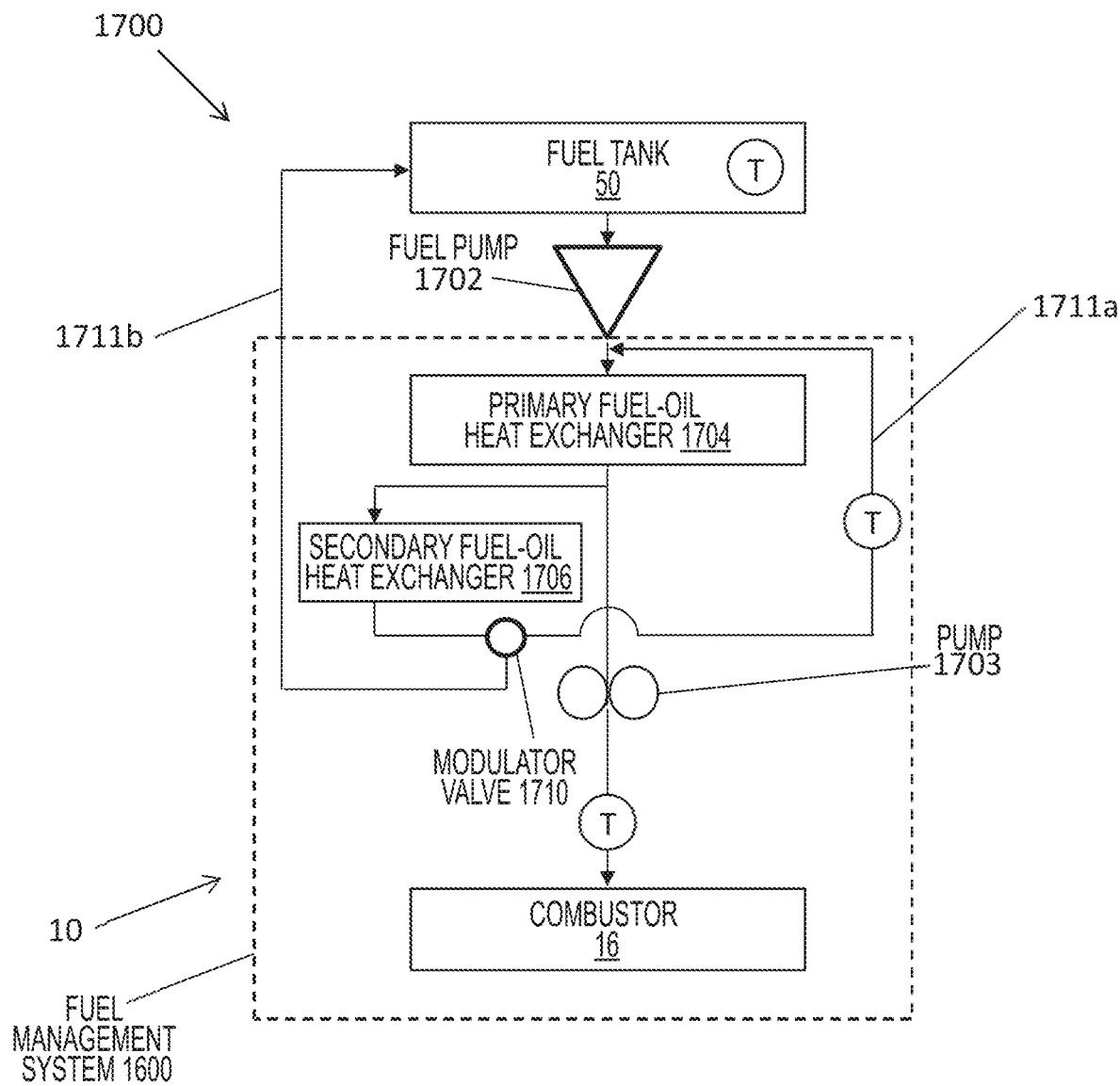
FIG. 16 is a schematic representation of an example fuel system comprising a fuel recirculation line.

Further example fuel systems 1400, 1700 comprising a fuel flow path from the fuel tank 50 to the combustor 16 of the gas turbine engine 10 of the aircraft 1 are shown schematically in FIGS. 15 and 16. The fuel system 1400 is similar to the fuel systems 1000, 1100 described above with respect to FIGS. 5 and 6, with like reference numerals indicating like elements. The fuel system 1700 is similar to the fuel systems 1200, 1300 described above with respect to FIGS. 7 and 14, with like reference numerals indicating like elements.

In the fuel systems 1400, 1700, a modulator valve 1410, 1710 is arranged to divert or direct at least a portion of fuel which has exited a fuel-oil heat exchanger back to the fuel tank 50 and/or to recirculate fuel to an upstream location on the fuel flow path. It may therefore perform the method of any one or more of FIGS. 8 to 13.

In the example shown in FIG. 15, the modulator valve 1410 of the fuel system 1400 is located downstream of the secondary fuel-oil heat exchanger 1406 and the pump 1403. The modulator valve 1410 is arranged to divert or direct at least a portion of the fuel from the pump 1403 back to the fuel tank 50 via a fuel return line 1411b, and is also arranged to recirculate fuel from the pump 1403 to a point upstream of the secondary heat exchanger 1406 via a fuel recirculation line 1411a. It will also be appreciated the modulator valve 1410 may alternatively be located at any suitable location in the fuel system 1400, for example on the fuel flow path.

The modulator valve 1410 may be arranged to modulate the flow of fuel along the fuel recirculation line 1411 a and the fuel return line 1411b in any suitable manner, for example as described above with respect to the fuel systems 1000, 1100, 1200, 1300 shown in FIGS. 5, 6, 7 and 14. The fuel system 1400 comprises an electronic controller 1001 configured to control operation (for example, opening and closing) of the modulator valve 1410. It will also be appreciated the methods 2000, 2100, 2200, 2300, 2400, 2500 shown in FIGS. 8 to 13 and described above with respect the fuel systems 1000, 1100, 1200, 1300 may equally be carried out using the fuel system 1400 shown in FIG. 15.

In the example shown in FIG. 16, the modulator valve 1710 of the fuel system 1700 is located downstream of the secondary fuel-oil heat exchanger 1706. Fuel exiting the secondary heat exchanger 1706 does not re-join the main fuel flow path (between the fuel tank 50 and the combustor 16). The modulator valve 1710 is arranged to divert or direct at least a portion of the fuel exiting the secondary heat exchanger 1706 back to the fuel tank 50 via a fuel return line 1711b, and is also arranged to recirculate fuel exiting the secondary heat exchanger 1706 to a point upstream of the primary fuel-oil heat exchanger 1704 on the main fuel flow path via a fuel recirculation line 1711a. It will also be appreciated the modulator valve 1710 may alternatively be located at any suitable location, for example on the main fuel flow path such that fuel exiting the secondary heat exchanger 1706 may re-join the main fuel flow path before encountering the modulator valve 1710.

The modulator valve 1710 may be arranged to modulate the flow of fuel along the fuel recirculation line 1711a and the fuel return line 1711b in any suitable manner, for example as described above with respect to the fuel systems 1000, 1100, 1200, 1300 shown in FIGS. 5, 6, 7 and 14. The fuel system 1700 comprises an electronic controller 1001 configured to control operation (for example, opening and closing) of the modulator valve 1710. It will also be appreciated the methods 2000, 2100, 2200, 2300, 2400, 2500 shown in FIGS. 8 to 13 and described above with respect the fuel systems 1000, 1100, 1200, 1300 may equally be carried out using the fuel system 1700 shown in FIG. 16.

The fuel temperatures being delivered to the combustor at cruise conditions, or at which fuel return is initiated, defined anywhere herein may be defined as an average over at least 5 minutes, 10 minutes, or 30 minutes, under steady state conditions. These average temperatures do not include transient spikes in temperature, which may be defined as fluctuations in temperature of the fuel during operation, often elevation of the temperature. Each fluctuation may not last more than 5 minutes.

Figure 17:
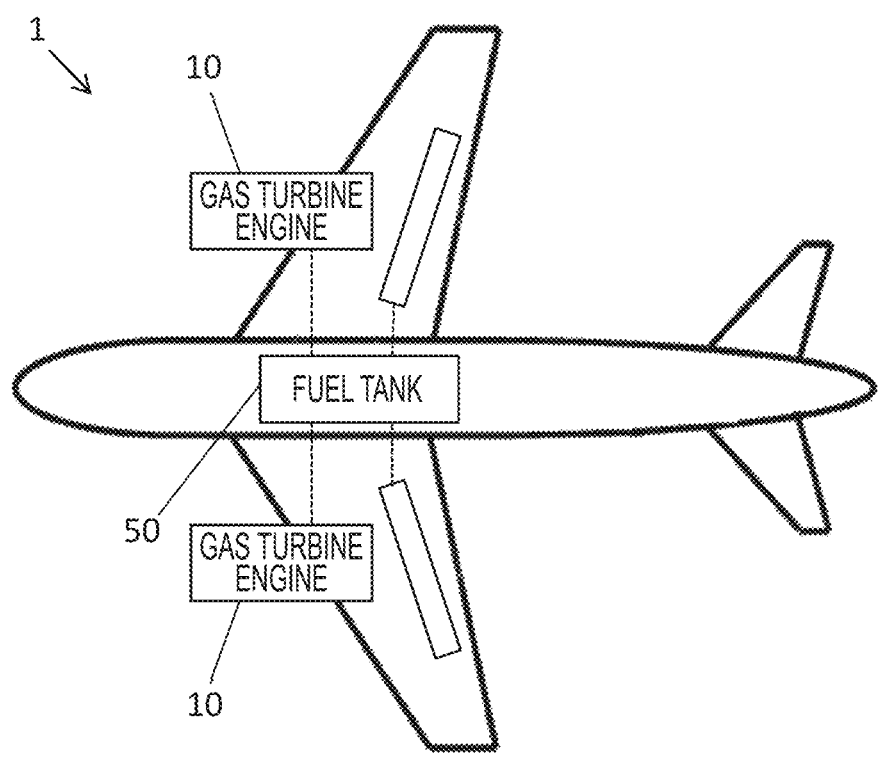
FIG. 17 is a representation of an aircraft with a propulsion system including two gas turbine engines.

FIG. 17 shows an aircraft 1 on which two gas turbine engines 10 of the present disclosure are mounted, one on each wing. Fuel F is provided from fuel tank 50 to the gas turbine engines 10. In this example, the fuel tank 50 comprises a set of interconnected fuel tanks. In the example shown in FIG. 17, the fuel tank is made up of a primary fuel tank located in the aircraft fuselage, and a smaller fuel tank located in each wing. In other examples, an aircraft 1 may have only a single fuel tank—it will be appreciated that many different tank layouts are envisaged and that the examples pictured are provided for ease of description and not intended to be limiting.

It will be understood that the invention is not limited to the examples above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine for an aircraft, comprising:
a combustor;
a fuel-oil heat exchanger arranged to receive fuel from a fuel tank on board the aircraft and transfer heat from oil to the fuel;
a fuel return line arranged to return at least some fuel that has passed through the fuel-oil heat exchanger to the fuel tank;
a controller; and
a modulator valve arranged to modulate a flow of fuel along the fuel return line,
wherein the controller is configured to control the modulator valve such that a ratio of a temperature, in Kelvin, of fuel in the fuel tank to a temperature, in Kelvin, of fuel being delivered to the combustor is less than 0.56.

2. The gas turbine engine of claim 1, wherein the controller is configured to control the modulator valve to modulate the flow of fuel along the fuel return line such that the ratio of the temperature, in Kelvin, of fuel in the fuel tank to the temperature, in Kelvin, of fuel being delivered to the combustor is less than 0.53.

3. The gas turbine engine of claim 1, wherein the controller is configured to control the modulator valve to modulate the flow of fuel along the fuel return line such that the ratio of the temperature, in Kelvin, of fuel in the fuel tank to the temperature, in Kelvin, of fuel being delivered to the combustor is between 0.48 and 0.56.

4. The gas turbine engine of claim 1, wherein the controller is configured to control the modulator valve to modulate the flow of fuel along the fuel return line such that the ratio of the temperature, in Kelvin, of fuel in the fuel tank to the temperature, in Kelvin, of fuel being delivered to the combustor is between 0.48 and 0.53.

5. The gas turbine engine of claim 1, wherein the controller is configured to control the modulator valve to modulate the flow of fuel along the fuel return line such that a ratio of a temperature, in Kelvin, of fuel in the fuel tank to a temperature, in Kelvin, of fuel being delivered to the combustor is between 0.48 and 1.00.

6. The gas turbine engine of claim 5, wherein the controller is configured to control the modulator valve to modulate the flow of fuel along the fuel return line such that the ratio of the temperature in Kelvin of fuel in the fuel tank to the temperature in Kelvin of fuel being delivered to the combustor is:
a) between 0.48 and 0.90;
b) between 0.48 and 0.82;
c) between 0.56 and 1.00;
d) between 0.56 and 0.82; or
e) between 0.56 and 0.75.

7. The gas turbine engine of claim 1, wherein the fuel-oil heat exchanger is arranged to transfer heat from the oil to the fuel so as to raise the fuel temperature to at least 120° C. on entry to the combustor.

8. The gas turbine engine of claim 1, wherein the fuel-oil heat exchanger is arranged to transfer heat from the oil to the fuel so as to raise the fuel temperature to between 120° C. and 180° C. on entry to the combustor.

9. The gas turbine engine of claim 1, wherein the gas turbine engine further comprises:
  i) a first temperature sensor located downstream of the fuel-oil heat exchanger; and
  ii) the first temperature sensor is configured to receive information from a second temperature sensor located in the fuel tank.

10. The gas turbine engine of claim 9, wherein the first temperature sensor is located in the fuel return line.

11. The gas turbine engine of claim 9, wherein the controller is configured to control the modulator valve to modulate the flow of fuel along the fuel return line based on temperature data from the first temperature sensor and the second temperature sensor.

12. The gas turbine engine of claim 1, wherein the temperature of fuel in the fuel tank is between −54 and 100° C.

13. A method of operating a gas turbine engine, the gas turbine engine including a combustor; a fuel-oil heat exchanger arranged to receive fuel from a fuel tank on board an aircraft and transfer heat from oil to the fuel; a fuel return line arranged to return at least some fuel that has passed through the fuel-oil heat exchanger to the fuel tank; and a modulator valve arranged to modulate a flow of fuel along the fuel return line;
  wherein the method comprises modulating the flow of fuel along the fuel return line using the modulator valve such that a ratio of a temperature in Kelvin of fuel in the fuel tank to a temperature in Kelvin of fuel being delivered to the combustor is less than 0.56.

14. The method of claim 13, wherein the modulating of the flow of fuel along the fuel return line using the modulator valve comprises modulating the flow of fuel such that the ratio of the temperature in Kelvin of fuel in the fuel tank to the temperature in Kelvin of fuel being delivered to the combustor is less than 0.53.

15. The method of claim 13, wherein the modulating of the flow of fuel along the fuel return line using the modulator valve comprises modulating the flow of fuel such that the ratio of the temperature in Kelvin of fuel in the fuel tank to the temperature in Kelvin of fuel being delivered to the combustor is between 0.48 and 0.56.

16. The method of claim 13, wherein the modulating of the flow of fuel along the fuel return line using the modulator valve comprises modulating the flow of fuel such that the ratio of the temperature in Kelvin of fuel in the fuel tank to the temperature in Kelvin of fuel being delivered to the combustor is between 0.48 and 0.53.

17. The method of claim 13, wherein the modulating of the flow of fuel along the fuel return line using the modulator valve comprises modulating the flow of fuel along the fuel return line using the modulator valve such that a ratio of a temperature in Kelvin of fuel in the fuel tank to a temperature in Kelvin of fuel being delivered to the combustor is between 0.48 and 1.00.

18. The method of claim 13, wherein the modulating of the flow of fuel along the fuel return line using the modulator valve comprises modulating the flow of fuel such that the ratio of the temperature in Kelvin of fuel in the fuel tank to the temperature in Kelvin of fuel being delivered to the combustor is:
  a) between 0.48 and 0.90;
  b) between 0.48 and 0.82;
  c) between 0.56 and 1.00;
  d) between 0.56 and 0.82; or
  e) between 0.56 and 0.75.

19. The method of claim 13, comprising transferring heat from the oil to the fuel using the fuel-oil heat exchanger so as to raise the fuel temperature to at least 120° C., on entry to the combustor.

20. The method of claim 13, wherein the gas turbine engine further comprises:
  i) a first temperature sensor located downstream of the fuel-oil heat exchanger; and
  ii) the first temperature sensor receives information from a second temperature sensor located in the fuel tank, and optionally:
    a) wherein the first temperature sensor is located in the fuel return line; and/or
    b) the method comprises modulating the flow of fuel along the fuel return line based on temperature data from the first temperature sensor and the second temperature sensor.

21. The method of claim 13, wherein the temperature of fuel in the fuel tank is between −54 and 100° C.

* * * * *